(12) United States Patent
Toeroe et al.

(10) Patent No.: US 11,985,035 B2
(45) Date of Patent: May 14, 2024

(54) AVAILABILITY OF NETWORK SERVICES

(71) Applicant: TELEFONAKTIEBOLAGET LM ERICSSON (PUBL), Stockholm (SE)

(72) Inventors: Maria Toeroe, Montreal (CA); Ferhat Khendek, Montreal (CA); Siamak Azadiabad, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 18/019,928

(22) PCT Filed: Aug. 4, 2021

(86) PCT No.: PCT/IB2021/057164
§ 371 (c)(1),
(2) Date: Feb. 6, 2023

(87) PCT Pub. No.: WO2022/038446
PCT Pub. Date: Feb. 24, 2022

(65) Prior Publication Data
US 2023/0291652 A1 Sep. 14, 2023

Related U.S. Application Data

(60) Provisional application No. 63/067,571, filed on Aug. 19, 2020.

(51) Int. Cl.
*H04L 12/24* (2006.01)
*H04L 41/0806* (2022.01)
(Continued)

(52) U.S. Cl.
CPC ...... *H04L 41/0895* (2022.05); *H04L 41/0806* (2013.01); *H04L 41/0823* (2013.01); *H04L 41/5003* (2013.01)

(58) Field of Classification Search
None
See application file for complete search history.

(56) References Cited

U.S. PATENT DOCUMENTS 9,882,828 B1 * 1/2018 Sandlerman ............ H04L 47/74
11,474,918 B1 * 10/2022 Sandlerman ........ G06F 11/1423
(Continued)

FOREIGN PATENT DOCUMENTS

WO 2020095232 A1 5/2020

OTHER PUBLICATIONS

ETSI, "Network Functions Virtualization (NFV); Resiliency Requirements", GS NFV-REL 001 V1.1.1 (Year: 2015).*
(Continued)

*Primary Examiner* — Boris D Grijalva Lobos
(74) *Attorney, Agent, or Firm* — Ericsson Inc.

(57) ABSTRACT

A method, system and computer readable media for mapping, for a network service (NS), requirements to configuration parameters and redundancy. The method includes marking Virtual Network Functions (VNFs) of a plurality of VNFs at each of a plurality of scaling levels and setting a recovery method for each VNF for each of a plurality of hosting types. The method includes finding configuration parameters, including values and options, for each marked and unmarked VNFs of each of a plurality of Network Forwarding Path (NFP) to satisfy the requirements, where each NFP corresponds to a functionality of the NS. The method includes finding a required number of standbys for each unmarked VNF of a Network Service Deployment Flavor (NsDF) of each of the plurality of hosting type. The method includes finding the hosting type having a minimum computing cost for all VNFs of the NsDF.

21 Claims, 6 Drawing Sheets

(51) Int. Cl.
  *H04L 41/0823* (2022.01)
  *H04L 41/0895* (2022.01)
  *H04L 41/5003* (2022.01)

(56) References Cited

U.S. PATENT DOCUMENTS

| | | | |
|---|---|---|---|
| 2015/0106143 | A1 | 4/2015 | Rai |
| 2018/0302278 | A1 | 10/2018 | De Andrade |
| 2020/0162323 | A1* | 5/2020 | Abu Lebdeh ....... H04L 41/0806 |

OTHER PUBLICATIONS

Xipeng Xiao, Chapter 2. What Is QoS?, Technical, Commercial and Regulatory Challenges of QoS, Oct. 2008, pp. 1-26, Morgan Kaufmann, USA.
B. Nicolae et al., "VeloC: Towards High Performance Adaptive Asynchronous Checkpointing at Large Scale", 2019 IEEE International Parallel and Distributed Processing Symposium (IPDPS), DOI 10.1109/IPDPS.2019.00099, IEEE Computer Society, 2019.
B. Satzger et al., "A Lazy Monitoring Approach for Heartbeat-Style Failure Detectors", IEEE The Computer Society, The Third International Conference on Availability, Reliability and Security, DOI 10.1109/ARES.2008.51, 2008.
ETSI GS NFV 002 V1.2.1 (Dec. 2014), "Network Functions Virtualisation (NFV); Architectural Framework", Disclaimer, group specification, 21 pages.
ETSI, "Network Functions Virtualisation (NFV); Reliability; Report on Models and Features for End-to-End Reliability", GS NFV-REL 003 V1.1.1, Apr. 2016.
ETSI, "Network Functions Virtualisation (NFV); Terminology for Main Concepts in NFV", GR NFV 003 V1.5.1, Jan. 2020.
F. Afsharnia, "Failure Rate Analysis", Chapter 7, Intech, CC BY, http://dx.doi.org/10.5772/intechopen.71849, 2017.
F. Tillman et al., "Determining Component Reliability and Redundancy for Optimum System Reliability", IEEE Transactions on Reliability, vol. R-26, No. 3, Aug. 1977.
H. Qing et al., "Virtual Network Protection Strategy to Ensure the Reliability of SFC in NFV", http://dx.doi.org/10.1145/3078564.3078583, ICIE '17, Aug. 17-18, 2017, Dalian Liaoning, China.
J. Fan et al., "GREP: Guaranteeing Reliability with Enhanced Protection in NFV", HotMiddlebox, DOI: http://dx.doi.org/10.1145/2785989.2786000, Aug. 21, 2015, 2015, London, United Kingdom.
J. Kong et al., "Guaranteed-Availability Network Function Virtualization with Network Protection and VNF Replication", IEEE, 2017.
M. Kumar et al., "Comparison between Different Checkpoint Schemes with Advantages and Disadvantages", International Journal of Computer Applications (IJCA) (0975-8887), National Seminar on Recent Advances in Wireless Networks and Communications, NWNC-2014.
Navid Nazarzadeoghaz; Ferhat Khendek; Maria Toeroe; Ericsson Inc, ECE, Concordia University; "Automated Design of Network Services from Network Service Requirements"; 23rd Conference on Innovations in Clouds, Internet and Networks (ICIN 2020).
R. Gupta et al., "Understanding Checkpointing Overheads on Massive-Scale Systems: Analysis of the IBM Blue Gene/P System", The International Journal of High Performance Computing Applications, DOI: 10.1177/1094342010369118, 2010.
S. Sadi et al., "On the Optimum Checkpointing Interval Selection for Variable Size Checkpoint Dumps", CIIA 2015, IFIP AICT 456, DOI: 10.1007/978-3-319-19578-0_49, 2015, pp. 599-610.
T. Soenen et al., "Optimising Microservice-based Reliable NFV Management & Orchestration Architectures", IEEE, 2017.
T. Zhang et al., "Overhead-Aware Deployment of Runtime Monitors", University of Pennsylvania Scholarly Commons, Departmental Papers (CIS), Department of Computer & Information Science, https://repository.upenn.edu/cis_papers, Oct. 2019.
W. Ding et al., "Enhancing the Reliability of Services in NFV with the Cost-Efficient Redundancy Scheme", IEEE ICC 2017 SAC Symposium SDN & NFV Track, 2017.
Francis Tam et al, "Service Availability—Definitions, Concepts and Principles" 2012, pp. 1-21, Chichester, UK.
ETSI, "Network Functions Virtualisation (NFV) Release 3; Management and Orchestration; Network Service Templates Specification", GS NFV-IFA 014 V3.3.1, Sep. 2019. https://www.etsi.org/deliver/etsi_gs/NFV-IFA/001_099/014/03.03.01_60/gs_NFV-IFA014v030301p.pdf.
ETSI, "Network Functions Virtualisation (NFV); Resiliency Requirements", GS NFV-REL 001 V1.1.1, Jan. 2015. https://www.etsi.org/deliver/etsi_gs/NFV-REL/001_099/001/01.01.01_60/gs_NFV-REL001v010101p.pdf.
ETSI, Network Functions Virtualisation (NFV) Release 3; Management and Orchestration; Os-Ma-Nfvo reference point—Interface and Information Model Specification, ETSI GS NFV-IFA 013 V3.1.1 (Aug. 2018) https://www.etsi.org/deliver/etsi_gs/nfv-ifa/001_099/013/03.01.01_60/gs_nfv-ifa013v030101p.pdf.

* cited by examiner

AVAILABILITY OF NETWORK SERVICES

This application is a 35 U.S.C. § 371 national phase filing of International Application No. PCT/IB2021/057164, filed Aug. 4, 2021, which claims the benefit of U.S. Provisional Application No. 63/067571, filed Aug. 19, 2020, the disclosures of which are incorporated herein by reference in their entireties.

TECHNICAL FIELD

The present disclosure relates to the availability of network services in the context of Network Functions Virtualisation (NFV).

BACKGROUND

A Network Service (NS) in the context of ETSI NFV is realized by interconnecting Virtual Network Functions (VNF) using Virtual Links (VL). A VNF is a software implementation of a Network Function (NF), which generally runs on top of Component Off the Shelf (COTS) hardware. VLs provide network connectivity between different VNF instances of an NS and between the internal components of each VNF instance. An NS is instantiated based on one of its deployment flavors (NsDF). The NsDF indicates a list of VNF profiles used for instantiating an NS instance of the NsDF. A VNF profile specifies the instantiation information for a specific deployment flavor of a VNF type. A VNF software implementation, i.e. a VNF type, can also have one or more VNF deployment flavors.

The NFV framework manages the virtualization technologies to provide virtual resources for the VNFs and it is not aware of VNFs functionality. Thus, we distinguish the virtualization aspect of a VNF from the VNF functionality it provides. Accordingly, an NS as a composition of VNFs delivers one or more NS functionalities by combining VNF functionalities. Telecom NSs are expected to deliver highly available services. Thus, it is important to design NSs which can meet the availability requirements at their service level for their functionalities, particularly when using COTS hardware, which is usually less reliable than specialized hardware.

Existing related research mostly focuses on the protection of the VNF functionality, i.e. on the design/redesign of NSs to have enough standbys for the VNFs. For example, an algorithm has been proposed to find the required number of standbys for the least reliable VNFs of the NSs while minimizing the computing resource consumption. It has been shown that solving this problem is NP-complete and heuristics are used. There is work aiming at reducing the computing cost that takes into account resource constraints. Some papers suggest protecting only the key VNFs to achieve a more efficient resource utilization. The problem of the distribution of VNF replicas has also been addressed, i.e. in addition to finding the number of required replicas for their VNFs, their placement on the existing physical nodes is also addressed. Others proposes to apply the 1+1 redundancy to all VNFs and calculate the networking overhead imposed by the availability mechanisms.

Existing related research mostly focuses on the protection of the VNF functionality. Often, it does not consider the availability of computing nodes at the infrastructure layer and cover only the application level availability. The goal of previous works is providing enough standbys for the VNFs. Some fix the redundancy as 1+1 for all VNFs, which may not be resource-efficient and/or enough in all cases for guaranteeing the expected availability of the VNF. Others rely on the microservice technology and benefit from the redundancy mechanisms available in microservice-based architectures.

SUMMARY

Most previous work do not address the NS outage time, which may depend on configuration parameters like the health-check rate. Some works partially address the recovery time. However, previous solutions lack guaranteeing the total service outage time for an NS satisfying an acceptable threshold. Works which provide a method of calculating the outage time during failover are application-specific and cannot be generalized easily.

There is no related work addressing the service disruption. Also, existing research does not consider the elasticity of NSs deployed in NFV systems.

Herein, we define the Service Disruption Time (SDT) for an NS functionality and the Service Data Disruption (SDD). Based on these definitions and the definition of availability, a method is proposed for mapping the requirements Required Availability (RA), Acceptable SDT (ASDT), and Acceptable SDD (ASDD) expressed by a tenant for different NS functionalities of an input NsDF to configuration parameters, which can guarantee meeting these tenant requirements for all scaling levels of the NsDF and minimize the cost of networking and computing resources at the same time.

Also, a heuristic algorithm is proposed to reduce the time complexity of the approach and make it useable for NSs with a large number of VNFs.

There is provided a method of mapping, for a network service (NS), requirements to configuration parameters and redundancy. The method comprises marking Virtual Network Functions (VNFs) of a plurality of VNFs at each of a plurality of scaling levels and setting a recovery method for each VNF for each of a plurality of hosting types. The method comprises finding configuration parameters, including values and options, for each marked and unmarked VNFs of each of a plurality of Network Forwarding Path (NFP) to satisfy the requirements, where each NFP corresponds to a functionality of the NS. The method comprises finding a required number of standbys for each unmarked VNF of a Network Service Deployment Flavor (NsDF) of each of the plurality of hosting type. The method comprises finding the hosting type having a minimum computing cost for all VNFs of the NsDF.

There is provided a system, operative to map, for a network service (NS), requirements to configuration parameters and redundancy. The system comprises processing circuitry and a memory, the memory containing instructions executable by the processing circuitry whereby the system is operative to mark Virtual Network Functions (VNFs) of a plurality of VNFs at each of a plurality of scaling levels and set a recovery method for each VNF for each of a plurality of hosting types. The system is operative to find configuration parameters, including values and options, for each marked and unmarked VNFs of each of a plurality of Network Forwarding Path (NFP) to satisfy the requirements, where each NFP corresponds to a functionality of the NS. The system is operative to find a required number of standbys for each unmarked VNF of a Network Service Deployment Flavor (NsDF) of each of the plurality of hosting type. The system is operative to find the hosting type having a minimum computing cost for all VNFs of the NsDF.

There is provided a non-transitory computer readable media having stored thereon instructions for mapping, for a network service (NS), requirements to configuration parameters and redundancy. The instructions comprise marking Virtual Network Functions (VNFs) of a plurality of VNFs at each of a plurality of scaling levels and setting a recovery method for each VNF for each of a plurality of hosting types. The instructions comprise finding configuration parameters, including values and options, for each marked and unmarked VNFs of each of a plurality of Network Forwarding Path (NFP) to satisfy the requirements, where each NFP corresponds to a functionality of the NS. The instructions comprise finding a required number of standbys for each unmarked VNF of a Network Service Deployment Flavor (NsDF) of each of the plurality of hosting type. The instructions comprise finding the hosting type having a minimum computing cost for all VNFs of the NsDF.

The method and system provided herein present improvements over previous methods and systems. With the proposed method, an NS design can be refined so that the expected availability and service disruption requirements can be met by the instantiated NS instance. The method calculates the redundancy needed for the different scaling levels and also maps the high-level requirements to application-level configuration parameter determining the availability and service disruption. Hence these goals can be guaranteed for the deployment.

DETAILED DESCRIPTION

Figure 1:
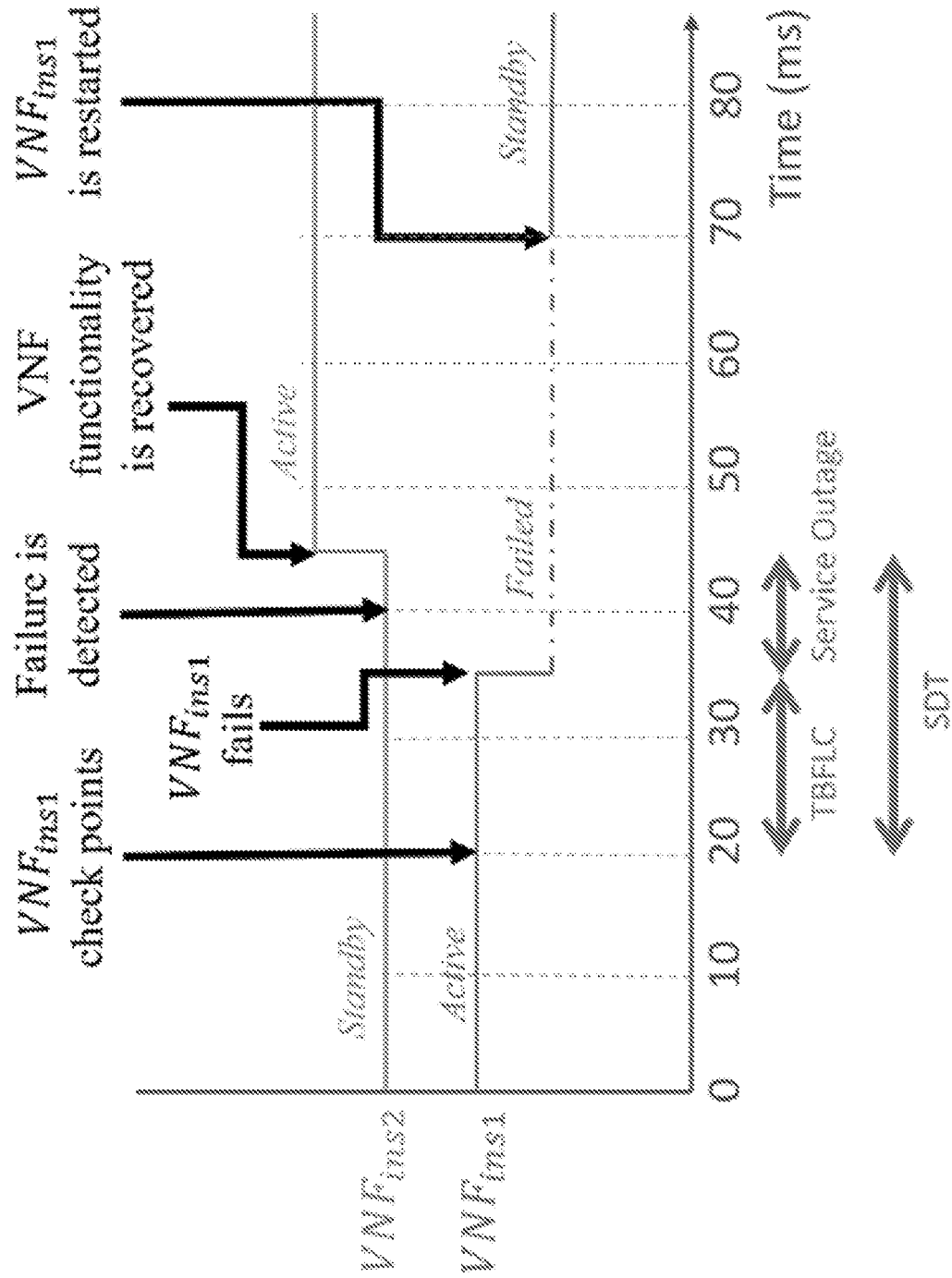
FIG. 1 is a graph illustrating an example of service outage and disruption time for an NS functionality provided by two VNF instances in 1+1 redundancy.

Various features will now be described with reference to the drawings to fully convey the scope of the disclosure to those skilled in the art.

Sequences of actions or functions may be used within this disclosure. It should be recognized that some functions or actions, in some contexts, could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed; these are generally illustrated with dashed lines.

Telecom NSs are expected to deliver highly available services. Thus, it is important to design NSs, which can meet the availability requirements at their service level for their functionalities, particularly, when using COTS hardware, which is usually less reliable than specialized hardware.

RA is defined as a required availability for a given NS functionality (i.e. at the NS service level), expressed in terms of nines. For example, six nines of RA (i.e. 99.9999%) for one NS functionality means that the overall outage time of the NS functionality in a year is required to be not more than 31.5 seconds. If the NS provides more than one functionality, different RAs may be requested for different functionalities.

A given topology of an NS is described as a VNF Forwarding Graph (VNFFG) Descriptor which references VNFs (i.e. VNF profiles). An NS may have more than one VNFFGs. A VNFFG contains one or more Network Forwarding Paths (NFPs). An NFP defines an ordered list of connection points associated with VNFs that form a sequence of NFs. We assume that each NS functionality is provided through a specific NFP of the NS. Different NFPs may have some VNFs in common, while not all VNFs of the NS may be involved in every NFP.

Since VNFs are the constituents of the NFP, a VNF failure can cause a service outage for the corresponding NS functionality. Herein, we refer to a VNF failure as the simultaneous failure of all active instances of a VNF profile causing an outage for the VNF functionality. An outage of a VNF functionality can cause service outage for the NS functionality in which the VNF is involved. Herein, we do not consider the case when only some active instances of a VNF fail together, that is when the corresponding NS functionality encounters a service degradation.

To meet an RA for an NS functionality, each VNF in each NFP in which it is used should satisfy a certain availability, i.e. for each VNF, its VNF instance(s) together should satisfy this expected availability (VnfEA). Therefore, based on the requested RA of the NS functionality, an NS designer can first find the VnfEA applicable to each VNF functionality. Then, based on the availability of a VNF instance if the availability provided for the VNF functionality by the VNF instance(s) does not satisfy the VnfEA, it is possible to provide additional redundant VNF instances. For example, for a stateful VNF, to protect a functionality for which N active VNF instances are needed to serve the workload, an appropriate number (i.e. M) of standby instances can guarantee that the probability of having at least N healthy active instances at any given moment is equal to or greater than the VnfEA. However, having an adequate redundancy cannot guarantee by itself that the availability of the VNF functionality is equal to or greater than the VnfEA.

The availability is expressed as the fraction of time for which the system is able to deliver its service during a given period. So, to guarantee an expected availability, the overall outage time of the VNF functionality should be kept bellow the acceptable outage time. For example, for a VNF functionality provided by one active instance, if this instance fails, the failure detection and recovery times determine the resulting outage time of the VNF functionality. Therefore, if the detection and the recovery times together are longer than the acceptable outage time, the availability of the VNF functionality is less than the VnfEA even if there are enough standby instances. The availability metrics such as failure detection and recovery time depend on and are impacted by some configuration parameters such as the Monitoring Health-check Rate (MHR) and the Failover Time (FoT). In fact, redundancy is used to reduce the recovery time. So, to meet the RA for an NS functionality, in addition to redundancy, it is also important to determine the appropriate values for these parameters provided they are configurable.

According to the definition of availability, whether a service is recovered from the initial state or it is restarted from a recently checkpointed state, the outage time is the same. For example, assume an NS which provides a video streaming service (i.e. NS functionality). Also, assume that the failure happens one hour after a movie has started to play, and the service is recovered in one second. Consider two cases: in one case, the service recovers from the last played frame before the failure and in the other case, it recovers from the beginning of the movie. For both cases, the service outage time is one second which means the service availability is the same, however the service disruption from a viewer's perspective is completely different. Therefore, to distinguish the difference we define the Service Disruption Time (SDT). The SDT for an NS functionality is the amount of time for which the service state is lost due to service outages for a given period. Furthermore, for some NS functionalities, the amount of data lost because of a state loss, that is, the Service Data Disruption (SDD) may need to be limited as well. Thus, the SDD for an NS functionality is the maximum amount of data lost during the Time Between a Failure and the Latest Committed checkpoint (TBFLC).

Different NsDFs of an NS may provide different sets of functionalities with different characteristics. Each NsDF defines different scaling levels for the NS. Each scaling level indicates the number of VNF instances for each VNF of the NS. Thus, an NS can be scaled dynamically at runtime and thereby the number of VNF instances change with the change of scaling levels. Changing the number of VNF instances can alter the protection of the VNF functionality. Thus, to meet the RA, the Acceptable SDT (ASDT), and/or the Acceptable SDD (ASDD) of an NS functionality, the NS scalability needs to be taken into consideration as well. In other words, all scaling levels of the NsDF should meet the requirements. We define ASDT as the acceptable service disruption time in a given period for which the service state is lost due to service outages. Also, ASDD is defined as the maximum acceptable amount of data lost due to a service outage.

A tenant may request an NS with certain functionalities associated with some availability and/or service disruption requirements. An NS design may start with creating an NsDF which provides the requested functionalities but may or may not meet all the non-functional requirements. Herein, it is shown how NS design can take as input an NsDF meeting the functional and some non-functional requirements like capacity, on the one hand, and the tenant's availability and/or service disruption requirements, on the other, and map these latter non-functional requirements to low-level constraints and adjustments to the input NsDF in terms of number of VNF instances to meet the requirements. The low-level constraints apply to metrics like MHR, networking bandwidth and latency, and checkpointing interval. The number of VNF instances is determined by the redundancy required for the different VNFs to meet the requirements. Doing so, the proposed method aims at minimizing the resource cost (i.e. computing and networking resources), while also addressing scalability.

Problem Definition

Whenever a functionality of a VNF is protected by a failover mechanism, the setting of the failover configuration parameters affects the availability of the VNF functionality, and consequently affects the availability of the corresponding NS functionality.

Referring to FIG. 1, for example, let us assume an NS functionality which is provided by one stateful VNF. The service data rate of the NS functionality is 30 Mbps. The VNF of this NS uses 1+1 redundancy to protect its VNF functionality. That is two VNF instances are used. To detect the failure of VNF instances, their health is monitored by health-check messages. Let also assume that the active instance checkpoints its state periodically to an external DB to enable the redundant instance to recover the VNF functionality from the last stored state. The state of the active instance changes continuously, as illustrated in FIG. 1. The active instance checkpoints its state every 20 ms and a health-check message is sent every 10 ms. At the beginning, $VNF_{ins1}$ is active and $VNF_{ins2}$ is standby. $VNF_{ins1}$ fails at time 35 ms. So, the next health-check message is not sent at 40 ms and $VNF_{ins2}$ starts preparing to become active. It takes 5 ms for $VNF_{ins2}$ to recover the state from the DB and become active. Thus, the service outage (i.e. the outage of the NS functionality) is 10 ms. However, the state recovered was checkpointed at 20 ms, resulting in an SDT of 25 ms. In addition, the SDD, that is, the service data lost during TBFLC is 460.8 Kb (i.e. 15 ms*30 Mbps).

If the ASDT or the ASDD is requested for an NS functionality, it is necessary to determine the TBFLC of the VNFs. This depends on the checkpointing method used.

For periodical checkpointing, the TBFLC depends on the failure time and the Time Between Consecutive Checkpoints (TBCC). In turn, the TBCC depends on the Checkpointing Interval (CpI) as more frequent checkpointing results in lower TBCC. The TBCC includes the checkpoint preparation time, the checkpoint transmission time, the checkpoint commitment time, and the waiting time for the next interval (i.e. CpI). For some VNFs, the CpI is configurable and for others it is not.

Alternatively, checkpointing may be performed as soon as there is a state change. This way, the checkpointing VNF becomes stateless as soon as the state is stored externally (e.g. in an external DB). For such VNFs, if the failure happens after a checkpoint has been written but before the next state change, then the SDT is only affected by the failure detection and the recovery times. However, if the failure happens during checkpointing, the current state is lost, and the service can only be recovered from the last committed checkpoint. Thus, in the best case, the TBFLC is (virtually) equal to zero. In the worst case, the TBFLC depends on the checkpoint preparation, transmission, and commitment times.

In either case, the TBFLC depends on the network delay, since the network delay affects the transmission time of the checkpoint data from the active VNF instance to the DB (or the peer VNF instance). We call this delay the Checkpointing Network delay (CNd). In addition, we assume that the average checkpoint preparation and commitment times are known for each VNF functionality.

The faster failures are detected, the faster the system can react and reduce the overall outage time and the SDT. The failures can be detected faster if the MHR is increased. Decreasing the CNd and/or CpI—if configurable—can reduce the SDT and SDD. For example, if there are multiple networks to choose from, by choosing a network which provides lower CNd, i.e. a network with lower latency and/or higher bandwidth, TBFLC can be improved.

However, increasing the MHR can burden the VNF with the execution of the monitoring logic and consequently decrease its performance. In addition, higher MHR imposes higher networking overhead as well. Selecting a lower value for a configurable CpI to have more frequent state checkpointing has similar effects. The need for guaranteeing a certain performance of the VNF instance puts constraints on the maximum acceptable MHR and, for a configurable CpI, the minimum CpI value. Thus, the MHR and CpI configuration values should be chosen within these boundaries. In addition, increasing the MHR, decreasing the CpI, and selecting a network option with less CNd increase the networking cost if the networking cost is defined based on the networking overhead and/or the network speed. So, there is a trade-off between improving service availability, SDT, or SDD and the networking cost. All these factors need to be considered for an appropriate set of configuration values.

Assuming that availability is always part of the requirements with respect to each NS functionality, a tenant may ask for one of the following three kinds of requirements:

RA,

RA together with an ASDD per failure, or

ASDT for a given period of time.

It is noteworthy to mention that since the ASDT includes the outage time the RA is also implied.

To meet these requirements, the appropriate configuration values for each VNF of the NFP need to be determined; and redundancy may also need to be introduced to ensure that when a failure happens, there is a VNF instance to failover to. Having more redundant instances (or standbys) can improve the protection of the VNF functionality, however, at the same time, the redundant instances increase the cost of computing resource. Thus, there is another trade-off between improving the protection of the VNF functionality and the computing cost.

Therefore, one goal in this work is to find the optimal configuration values and number of standbys for all VNFs of an NsDF that meet the tenant availability and service disruption requirements for all NS functionalities and minimize the networking and computing costs at the same time. There is also a need to guarantee that the requirements are met at any scaling level of the NsDF.

VNF Availability and Service Disruption

This section, shows how the redundancy, outage time, and SDT are calculated for a VNF.

VNF Availability

The availability of a VNF has two aspects: VNF redundancy and outage time.

VNF Redundancy

The purpose of applying the N+M redundancy to a VNF is to provide enough standby VNF instances that can become active when active instances fail.

The availability of a VNF instance ($A_{vnf}$) is the product of the availability of the VNF application ($A_{vnf\text{-}app}$) and the availability of the hosting infrastructure ($A_{hosting}$) as shown in equation (1).

$$A_{vnf}=A_{hosting}*A_{vnf\text{-}app} \quad (1)$$

The availability of a VNF application can be provided by the VNF vendor, and the infrastructure owner can provide the availability of the hosting infrastructure. For a VNF with N active and M standby instances, where any standby can replace any active instance of the VNF, the overall availability ($A_{VNF}$) is:

$$A_{VNF} = \sum_{k=0}^{M} \binom{N+M}{N+k} A_{vnf}^{N+k} * (1-A_{vnf})^{M-k}, \quad (2)$$

where $N > 0 \,\&\, M \geq 0$

Assuming a VNF with three active instances (i.e. N=3) and one standby instance (i.e. M=1), where the availability of all instances is the same:

$$A_{vnf_1}=A_{vnf_2}=A_{vnf_3}=A_{vnf_4}=A_{vnf} \quad (3)$$

If no more than one instance fails for this VNF, the availability goal is met. As a result, the availability of this VNF is:

$$A_{VNF}=(A_{vnf_1}*A_{vnf_2}*A_{vnf_3}*(1-A_{vnf_4})) (A_{vnf_1}*A_{vnf_2}*(1-A_{vnf_3})*A_{vnf_4})+(A_{vnf_1}*(1-A_{vnf_2})*A_{vnf_3}*A_{vnf_4})+((1-A_{vnf_1})*A_{vnf_2}*A_{vnf_3}*A_{vnf_4})+(A_{vnf_1}*A_{vnf_2}*A_{vnf_3}*A_{vnf_4}) \quad (4)$$

Therefore, considering equation (3), $A_{VNF}$ is:

$$A_{VNF}=4*A_{vnf}^3*(1-A_{VNF})*A_{VNF}^4 \quad (5)$$

Equation (5) can be re-written as:

$$A_{VNF} = \binom{4}{3} A_{vnf}^3 * (1-A_{vnf})^1 + \binom{4}{4} A_{vnf}^4 * (1-A_{vnf})^0 \quad (6)$$

Which means that the availability target of this VNF is met if three VNF instances are available and one has failed, or if all instances are available. We can generalize equation (6) as equation (2).

VNF Outage Time

Even when there are enough standby VNF instances, still the outage time of the VNF functionality may be unacceptable with respect to the expected availability, if the failure detection and/or recovery times are too long. To meet the expected availability, the outage time of the functionality needs to be not more than the acceptable outage time.

The input NsDF only includes the number of active instances (i.e. N) for each VNF. Therefore, if these N instances fail at the same time, the VNF functionality is not provided and there is service outage at the NS functionality level. If the Average Failure Rate of the VNF is $AFR_{VNF}$, and the Mean Time To Repair/Recover a VNF instance is $MTTR_{vnf}$, then the Outage Time (OT) of the VNF ($OT_{VNF}$) in a given period is:

$$OT_{VNF}=AFR_{VNF}*MTTR_{vnf} \quad (7)$$

To calculate the $AFR_{VNF}$, we use equations (8). It shows how the AFR of a system for a time-period of t is calculated, knowing the reliability of the system (R (t)).

$$AFR = \frac{-\frac{dR(t)}{dt}}{R(t)} \quad (8)$$

Assuming that the Average Failure Rate of one VNF instance ($AFR_{vnf}$) is given for a time-period of t, the reliability of one instance is:

$$R_{vnf}(t) = e^{-AFR_{vnf}*t} \quad (9)$$

Then, the reliability of N (active) instances ($R_{vnf}(t)$) is calculated using equation (10).

$$R_{VNF}(t) 1 - (1 - R_{vnf}(t))^N \quad (10)$$

Therefore, the $AFR_{VNF}$ for a given period of t would be:

$$AFR_{VNF} = \frac{N(1 - e^{-AFR_{vnf}*t})^{N-1}(AFR_{vnf} * e^{-AFR_{vnf}*t})}{1 - (1 - e^{-AFR_{vnf}*t})} \quad (11)$$

Considering equation (7) there is no control over the average failure rate of the VNF. Thus, in case the $OT_{VNF}$ needs to be adjusted, only the $MTTR_{vnf}$ can be adjusted.

If the recovery mechanism for a VNF is failover and the active instances checkpoint to a peer, the $MTTR_{vnf}$ is calculated as the summation of its failure detection time ($FDT_{vnf}$), the time to failover to a standby ($FoT_{vnf}$), and the time for the standby to take over the service ($ToT_{vnf}$)—i.e. prepare itself to start serving.

$$MTTR_{vnf} = FDT_{vnf} + FoT_{vnf} + ToT_{vnf} \quad (12)$$

For the restart recovery mechanism, if the checkpoint is accessible locally, the $MTTR_{vnf}$ is calculated as the summation of its $FDT_{vnf}$, Restart Time ($RT_{vnf}$), and $ToT_{vnf}$.

$$MTTR_{vnf} = FDT_{vnf} + RT_{vnf} + ToT_{vnf} \quad (13)$$

For a VNF which checkpoints only to a remote DB, the recovery time also depends on the time to retrieve a checkpoint from the DB. We assume the network delay to retrieve a checkpoint is equal to the network delay of writing a checkpoint (i.e. CNd) to the DB. Therefore, for the failover mechanism, the $MTTR_{vnf}$ is:

$$MTTR_{vnf} = FDT_{vnf} + FoT_{vnf} + ToT_{vnf} + CNd_{vnf} \quad (14)$$

For the restart recovery, the $MTTR_{vnf}$ is:

$$MTTR_{vnf} = FDT_{vnf} + RT_{vnf} + ToT_{vnf} + CNd_{vnf} \quad (15)$$

In equation (12) to (15), it can be assumed that for every VNF the average failover/restart and takeover times are known. The $CNd_{vnf}$ is adjustable, and it is shown later how it is calculated. The $FDT_{vnf}$ is also adjustable by configuring the MHR. Generally, in the worst case, the FDT is the summation of Health-check Interval $$\left(HI = \frac{1}{MHR}\right)$$

and the timeout. So, $FDT_{vnf}$ in the worst case would be:

$$FDT_{vnf} = HI_{vnf} + \text{timeout}_{vnf} \quad (16)$$

The goal for the timeout is to reduce the false-positive failure detections. If the timeout is configurable, it should be greater than the network delay between the monitoring agent/peer and the monitored application/node. The timeout is configured once and fixed for the setup and different health-check rates.

VNF Service Disruption Time

According to our definition of SDT, the disruption time of a VNF due to a single failure is the summation of the $MTTR_{vnf}$ and the $TBFLC_{vnf}$. Therefore, the SDT of a VNF for all failures in a given period of time is:

$$SDT_{VNF} = AFR_{VNF} * (MTTR_{vnf} + TBFLC_{vnf}) \quad (17)$$

In equation (17), the TBFLC may be adjustable for some VNFs, if there are multiple networking options to adjust the CNd and/or if the CpI is configurable.

TBFLC of a VNF

The TBFLC for a VNF is calculated differently for different kinds of CpI and checkpointing methods. In this section, we introduce these for the different cases.

Constant CpI: In this case the active VNF instance checkpoints at fixed intervals. However, the CpI value may be either configurable or not. If the interval is configurable, the CpI can be chosen usually from a predefined set of discrete values.

Variable CpI: In this case, the active VNF instance creates a checkpoint whenever its state changes. Therefore, the CpI is not configurable.

Synchronous checkpointing: the next checkpoint preparation cannot start until the previous one is committed.

In case of variable CpI, the worst case happens when there is a failure during checkpointing just before the commitment of the checkpoint. Hence, the TBFLC is:

$$TBFLC_{vnf} \text{ in the Worst}$$
$$Case = Checkpoint\_Preparation\_Time + CNd +$$
$$Checkpoint\_Commitment\_Time + \quad (18)$$

For synchronous checkpointing with constant CpI, the worst case is also when the failure happens just before committing a checkpoint. Thus, the state is recovered from the previous checkpoint which was prepared at the beginning of the previous interval. Therefore, the TBFLC is:

$$TBFLC_{vnf} \text{ in the Worst}$$
$$Case = 2*Checkpoit\_Preparation\_Time + 2*CNd +$$
$$2*Checkpoint\_Commitment\_Time + CpI \quad (19)$$

Asynchronous checkpointing: the checkpointing operations are performed independently from each other in this case, which means that the preparation of the next checkpoint can start before the previous one has been committed.

For asynchronous checkpointing with constant CpI, the worst case is when the latest checkpoint and maybe some other previously sent checkpoints still in transit have not been committed yet when the failure happens. Therefore, the state recovered is the state at the beginning of the preparation of the latest committed checkpoint. Thus, the TBFLC is:

$$TBFLC_{vnf} \text{ in Worst}$$
$$Case = 2*Checkpoit\_Preparation\_Time + CNd +$$
$$Checkpoint\_Commitment\_Time + CpI \quad (20)$$

For asynchronous checkpointing with variable CpI, the VNF is stateful during the checkpoint preparation, transfer and committing time. After that the VNF becomes stateless. Thus, the TBFLC in the worst case is:

$$TBFLC_{vnf} \text{ in the Worst}$$
$$Case = Checkpoint\_Preparation\_Time + CNd +$$
$$Checkpoint\_Commitment\_Time \quad (21)$$

Equations (18) to (21) provide the calculation of TBFLC for one VNF instance. For a failed VNF (i.e. all active instances fail simultaneously), in the worst case, the TBFLC of each instance is the worst possible TBFLC. Therefore, the TBFLC of a VNF, in the worst case, is equal to the worst-case TBFLC of one VNF instance.

Checkpointing Network Delay

The networking delay to send a message from a source to a destination is the summation of the transmission delay and the propagation delay. So, the CNd is calculated by equation (22).

$$CNd = \text{Transmission Delay} + \text{Propagation Delay} \quad (22)$$

Here, at checkpointing, the source is the active VNF instance, the message is the checkpoint data, and the destination is a DB or a peer VNF instance. At recovery, if the checkpoint is stored in a DB, it becomes the source and the standby VNF instance is the destination. The transmission delay is derived from the checkpoint data size divided by the network bandwidth. The propagation delay (also referred as networking latency) depends on the distance between the source and the destination, and the transmission speed of the network.

$$\text{Transmission Delay} = \frac{\text{Checkpointing Data Size}}{\text{Bandwidth}} \quad (23)$$

$$\text{Propagation Delay} = \frac{\text{Distance}}{\text{Transmission Speed}} \quad (24)$$

The bandwidth and propagation delay of VLs can be indicated for NSs. So, for a known average checkpoint size, to adjust the CNd, an appropriate bandwidth can be determined and/or an appropriate networking latency/propagation delay can be asked for.

VNF Service Data Disruption

SDD of a VNF ($SDD_{VNF}$) due to a failure, in the worst case, is the product of the VNF data rate and the TBFLC of a VNF instance.

$$SDD_{VNF} = (\text{Data\_Rate}_{VNF}) * (TBFLC_{vnf}) \quad (25)$$

In other words, after recovering from the last checkpoint data that was sent from the time of this checkpoint till the failure will be resent.

Availability and Service Disruption of an NS Functionality

In this section, we present how the RA, ASDT, and ASDD of each NS functionality are mapped to low-level configuration constraints using the equations presented in the previous section.

NFP Down Time

The proposed solution considers the RAs of NFPs separately. Herein, it is assumed that the availability of VLs is enough to meet the RA as the availability of a VL can be requested the same way as the networking latency.

The availability of a functionality delivered via an NFP is the product of the availability of VNFs in the NFP, since every VNF contributes with its functionality to the NS functionality. In other words, the outage time for an NS functionality is the summation of the outage times of its VNFs. So, using equation (7), for an NFP with X different VNFs, the Total Down Time ($TDT_{NFP}$) of the functionality provided through the NFP would be:

$$TDT_{NFP} = \Sigma_{i=1}^{X} OT_i \quad (26)$$

Therefore, to meet the RA for an NS functionality, the acceptable downtime (ADT) should be calculated and the $MTTR_{vnf}$ of the different VNFs adjusted to keep the $TDT_{NFP}$ less than or equal to the ADT. For a given period, the ADT is calculated using equation (27).

$$ADT = (\text{time period}) * (1 - RA) \quad (27)$$

NFP Service Disruption Time

The SDT of a functionality provided through an NFP, in the worst case, is the summation of the SDTs of its VNFs. The worst case happens when there is no overlap between the failures of the different VNFs. If an NFP includes X different VNFs, using equation (17), the overall SDT of the functionality provided through the NFP is:

$$SDT_{NFP} = \Sigma_{i=1}^{X} SDT_i \quad (28)$$

For each VNF, depending on the checkpointing method, the worst case TBFLC is used in equation (17) to calculate the worst-case scenario for the NFP by equation (28). When the tenant asks for the ASDT of an NS functionality, the $MTTR_{vnf}$ and $TBFLC_{vnf}$ the different VNFs should be adjusted so that the $SDT_{NFP}$ is less than or equal to the ASDT

NFP Service Data Disruption

For an NFP with one or more VNFs, there is a ratio between each VNF data rate and the NFP data rate.

$$\text{Data\_Rate}_{NFP} = \text{Data\_Rate}_{VNF} * \text{Ratio}_{VNF} \quad (29)$$

Therefore, the SDD at NFP level due to the failure of one VNF is:

$$SDD_{NFP} = (SDD_{VNF}) * (\text{Ratio}_{VNF}) \quad (30)$$

Thus, to satisfy the ASDD for the functionality provided through an NFP (i.e. to satisfy $SDD_{NFP} \leq ASDD$) with X different VNFs, the $TBFLC_i$ of each $VNF_i$ of the NFP should be adjusted to satisfy inequation (31).

$$TBFLC_i \leq \frac{ASDD}{(\text{Data\_Rate}_i) * (\text{Ratio}_i)}, \quad \text{where} \quad 1 \leq i \leq X \quad (31)$$

The $\text{Data\_Rate}_{VNF}$ and the $VNF_{Ratio}$ are inputs for all VNFs for each NFP.

NS Scaling Impact on Availability and SDD

For different scaling levels of the NsDF with different number of VNF instances, different number of standbys are needed to guarantee the same level of protection for the provided functionalities. Equation (2) shows that there is no straightforward relation between the number of actives (i.e. N) and standbys (i.e. M). Assuming that the NsDF received as input specifies only the number of required active instances N, the number of standbys for each scaling level should be calculated separately, since the value of N may be different for different scaling levels. When the required number of standby instances for each scaling level is determined, the deployment flavor of the given NS design should be modified and the active number of instances replaced with the sum of active and standby numbers of instances for each scaling level of each VNF.

For different scaling levels, the $\text{Data\_Rate}_i$ may also be different. As a result, the $TBFLC_i$ should satisfy different values according to equation (31). So, to satisfy the ASDD for all scaling levels, in equation (31) the maximum possible data rate for each VNF of the NFP (i.e. at the highest scaling level) is used.

Cost Function

When the number of required standby instances for a VNF is calculated the computing cost is also addressed. So, the minimum number of required instances for each VNF is found at each scaling level that satisfies the VnfEA to avoid overprovisioning of the computing resources for the VNF. It is possible to have multiple hosting types to choose from for VNF placement. Different hosting types may have different $A_{hosting}$ and result in different $A_{vnf}$ according to equation (1). Therefore, for different hosting types it is possible to end up with different required number of standby instances for a VNF. Also, different hosting types may have different cost. For example, placing a VNF on one hosting type with better availability may be twice as expensive compared to placing the same VNF on a host with lower availability.

Therefore, a cost function is defined to be able to choose the hosting option which results in a lower computing cost for the VNFs. We assume that all VNFs of the given NsDF will be placed on the same hosting type. Computing cost of each $VNF_i$ at the $j^{th}$ scaling level of the NsDF for each hosting type with known cost coefficient ($CC_h$) is calculated by equation (32).

$$C(VNF_{i,j})=(N_{i,j}+M_{i,j})*CC_h \quad (32)$$

Since the number of VNF instances may be different at different scaling levels, the average number of VNF instances is used to calculate the overall computing cost ($C(VNF_i)$) for each $VNF_i$.

$$C(VNF_i)=(\overline{N_i+M_i})*CC_h \quad (33)$$

Therefore, for an NsDF with X different VNFs, the overall computing cost would be:

$$C(NsDF)=\Sigma_{i=1}^{X}C(VNF_i) \quad (34)$$

To minimize the networking cost, a cost function for NFPs is defined, which is calculated differently depending on the protection mechanisms configured (e.g. health-check monitoring, checkpointing), which in turn depend on the tenant's requirements. Other portion of the networking cost are considered constant and out of control.

The networking cost for $VNF_i$ of an NFP which has $N_j$ active instances at the $j^{th}$ scaling level is:

if the requirement is to satisfy the RA, $$C(VNF_{i,j})=N_{i,j}*(MHR_{i,j}) \quad (35)$$

if the tenant asks for an ASDT.

$$C(VNF_{i,j}) = N_{i,j} * \left( \alpha * MHR_{i,j} + \beta * \frac{1}{CpI_{i,j}} + \gamma * \frac{1}{CNd_{i,j}} \right) \quad (36)$$

According to the cost function (36), regardless whether the MHR increases, the CpI decreases, or a faster network is selected, the networking cost for the VNF increases. To be able to adjust the importance of these three configuration parameters coefficients (i.e. $\alpha$, $\beta$, and $\gamma$) are used in the equation.

Accordingly, the total cost for the NFP at scaling level j is:

$$C(NFP_j)=\Sigma_{i=1}^{X}C(VNF_{i,j}) \quad (37)$$

Requirement Mapping Method

A tenant may ask for different kinds of requirements for different NS functionalities. Also, for functionalities with the same kind of requirements, the required values may differ. So, for each NS functionality, there is a specific kind of requirement with a specific value to be met. The goal of the present mapping method is to satisfy the corresponding requirement for each NS functionality and minimize the networking cost at the same time. Then, the hosting option with the lowest computing cost is found considering all the VNFs of the NsDF.

First, for the VNFs the optimal MHR and CpI values and networking options are found that satisfy the requirements for each NS functionality and minimize the networking cost. Then, the minimum required number of standby instances for each VNF that keeps the probability of having enough active VNF instances higher than VnfEA are found. To minimize the computing resource cost, the whole process is repeated using different hosting types and the hosting option with the minimum total cost for the NsDF is selected.

For some VNFs, the VNF instance availability may be enough to satisfy the VnfEA without any standby instance(s) for some/all scaling levels. In such a case, the recovery method for the VNF is the restart recovery. Therefore, the MTTR that is appropriate for the restart in equations (12) to (15) should be used for each VNF, and then the method of finding the optimal values/options for the MHR, the CpI, and networking can be applied. However, at the beginning it is not known yet whether the VNF instance availability would satisfy the applicable VnfEA. One way to solve this problem is to perform the method at each scaling level for equations (12)/(14) and (13)/(15) for all VNFs and choose the solution which results in the highest number of VNFs without any standby instance. If an NFP has X different VNFs, the time complexity of examining all combinations of MTTRs for all VNFs would be:

$$\text{Time Complexity}=O(2^X) \quad (38)$$

This exponential time complexity is not acceptable for large X, i.e. large number of VNFs.

In the context of this work, this problem can be avoided as follows: first, the VnfEA is calculated for each VNF assuming that the failover mechanism is used for the VNFs. Then, the availability of each VNF is calculated with zero standby and is compared with the VnfEA. If the VNF without any standby can satisfy the VnfEA, the VNF is marked. At the end of this process, there are some marked and some unmarked VNFs, and it is possible to determine the appropriate MTTR equation for each VNF; equation (12) or (14) should be used for unmarked VNFs, and equation (13) or (15) is the appropriate one for marked VNFs. This can be done because the method adjusts other configuration values (e.g. for MHR) to the difference between the two MTTRs.

Next, the number of standby instances for the unmarked VNFs can be calculated and based on this number the calculation of the computing cost for the NsDF can be tackled.

The steps of the proposed mapping method can be summarized as follows: step 1 creates a loop for different hosting types, and steps 2 to 18 are performed in this loop. Step 2 creates another loop for the scaling levels, and steps 3 to 17 are performed in this loop. Step 3 creates a third loop for the requested NS functionalities and steps 4 to 7 are performed in this loop. The goal of performing steps 3 to 11 is to mark VNFs and set the appropriate recovery method for each VNF at each scaling level for each hosting type. Step 12 creates a loop for the requested NS functionalities and steps 13 and 14 are performed in this loop for marked and unmarked VNFs. Executing steps 12 to 15, the optimal configuration values/options for each marked and unmarked VNF of each NFP is found to satisfy the requirements. Steps 16 and 17 find the required number of standbys for each unmarked VNF of the NsDF for each hosting type. Step 18 and 19 find the hosting type with minimum computing cost for all VNFs of the NsDF.

Figure 2:
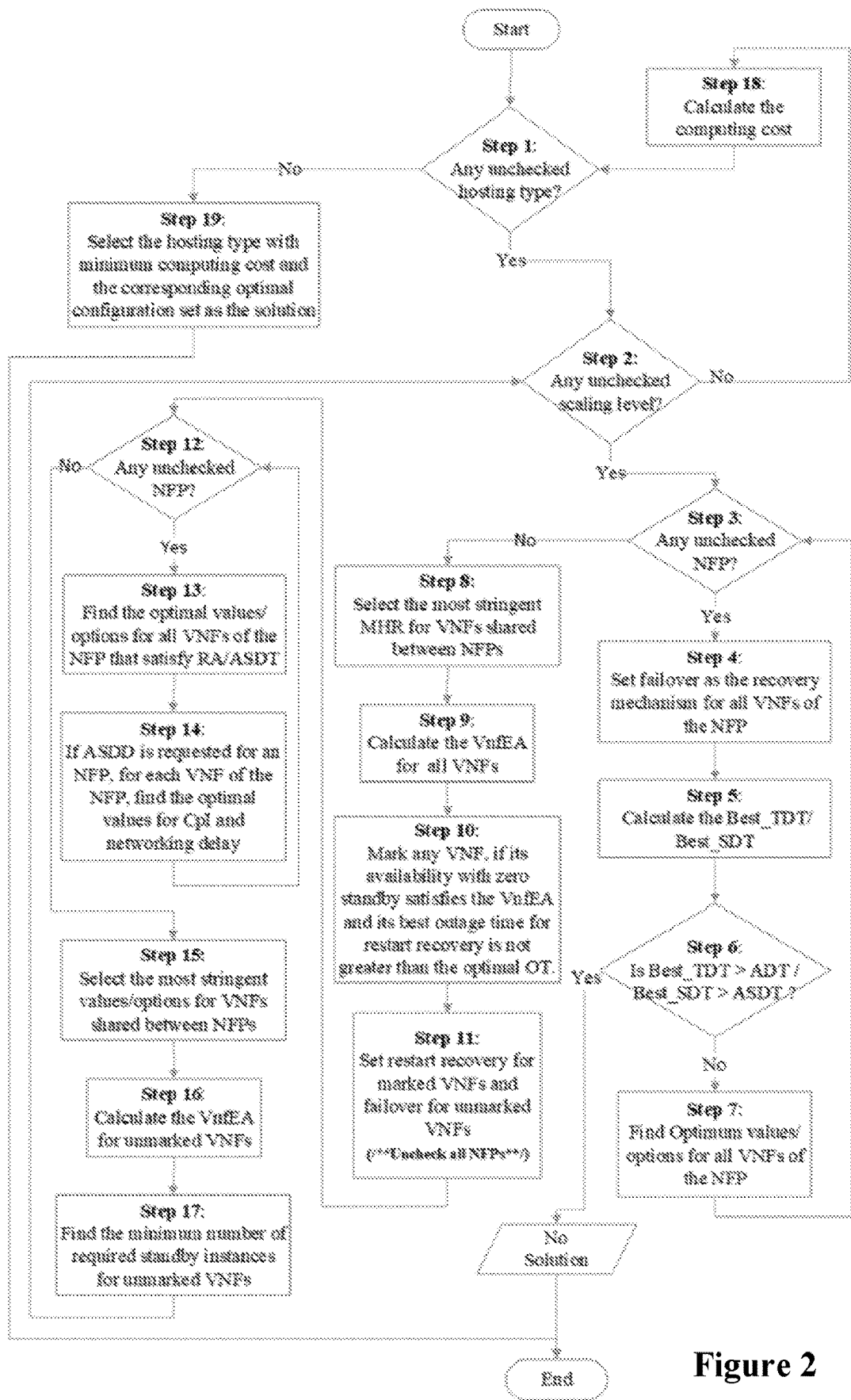
FIG. 2 is a flowchart of an example requirement mapping method.

FIG. 2. depicts the flowchart of a requirement mapping method consisting of the following steps:

Step 1: For each hosting type, perform steps 2 to 18

Step 2: For each scaling level perform steps 3 to 17.

Step 3: For each NFP (i.e. NS functionality) perform steps 4 to 7.

Step 4: Set failover as the recovery mechanism for all VNFs of the NFP to use equation (12) or (14) for all VNFs.

Step 5: For an NFP either the RA or the ASDT is requested. If the RA is requested, calculate the ADT using equation (27). Then, calculate the best possible TDT (Best_TDT) for the NFP based on equation (26). The Best_TDT can be found using the maximum allowed value for $MHR_i$ of each $VNF_i$ of the NFP. If the ASDT is requested, calculate the best possible SDT (Best_SDT) for the NFP according to equation (28). The Best_SDT can be found using the maximum allowed value for $MHR_i$, the minimum allowed value for $CpI_i$, and choosing the best available Networking option for all $VNF_i$ of the NFP.

Step 6: If the RA is requested, compare the Best_TDT with the ADT. If Best_TDT>ADT, the RA for this NFP cannot be achieved with the given VNFs and there is no solution. Otherwise, go to the next step. If an ASDT is requested, compare the Best_SDT with the ASDT. If Best_SDT>ASDT, then the ASDT for this NFP cannot be achieved with the given VNFs. Otherwise, go to the next step.

Step 7: If the RA is requested and Best_TDT=ADT, the best value of $MHR_i$ for each $VNF_i$ is the only acceptable configuration. If Best_TDT<ADT, there may be multiple values of $MHR_i$ for different VNFs of the NFP that can satisfy the RA. Then, find the optimal values for the $MHR_i$ for all $VNF_i$ of the NFP that minimize the cost for the scaling level (equation (37)) and satisfies the requirement (i.e. RA). If an ASDT is requested and Best_SDT=ASDT, the best values/options for $MHR_i$, $CpI_i$, and networking for all $VNF_i$ make the only acceptable configuration. If Best_SDT<ASDT, there may be multiple values/options for $MHR_i$, $CpI_i$, and networking for different VNFs of the NFP that can satisfy the ASDT. Then, find the optimal values/options for the $MHR_i$, $CpI_i$ and networking for all $VNF_i$ of the NFP that minimize the cost for the scaling level (equation (37)) and satisfies the requirements (i.e. ASDT).

To find the optimal configuration to satisfy the RA, equations (26) and (37) are calculated for all possible $MHR_i$ of all $VNF_i$ of the NFP, and the configuration values that result in the minimum cost while satisfying the ADT are chosen. To find the optimal configuration to satisfy an ASDT, equations (28) and (37) are calculated for all possible combinations of values/options for the $MHR_i$, the $CpI_i$, and networking for all $VNF_i$ of the NFP and the configuration values that result in the lowest cost while satisfying the ASDT are chosen. Thus, to find the optimal configuration in this step, all possible combinations are examined, that is, a Complete Search is performed.

Step 8: For VNF shared between multiple NFPs, select the most stringent $MHR_i$ among the solutions found in step 7 for the different NFPs.

Step 9: Calculate for each $VNF_i$ of the NsDF the $VnfEA_i$ using equation (39) based on the optimal value for its $MHR_i$ selected in steps 7 and 8:

$$VnfEA_i = \frac{\text{Uptime}}{\text{Uptime} + OT_i} = \frac{1 \text{ year} - OT_i}{1 \text{ year}} \quad (39)$$

With the optimal value for $MHR_i$ and its relation to $FDT_i$ (i.e. equation (16)), the $OT_i$ can be calculated using equation (7). Since RA is defined for one year, the Uptime is calculated as "one year" minus $OT_i$.

Step 10: Calculate the availability of each $VNF_i$ using equation (2) with zero standby instance ($A_{VNF_{i-o}}$) and the best outage time of each $VNF_i$ for restart recovery mechanism ($OT_{i-best}$), using the best $MHR_i$. If $A_{VNF_{i-o}} \geq VnfEA_i$ and $OT_{i-best} \leq OT_i$, mark the VNF. If $OT_{i-best}$ is greater than the optimal $OT_i$ found in step 9, the $VNF_i$ cannot meet the same $VnfEA_i$ for restart recovery mechanism with no possible $MHR_i$.

Step 11: Set restart recovery (i.e. equation (13) or (15)) for marked VNFs and failover (i.e. equation (12) or (14)) for unmarked VNFs.

Step 12: For each NFP, perform steps 13 and 14.

Step 13: Find the optimal values/options for the $MHR_i$, and—if ASDT is requested—for the $CpI_i$ and networking for all $VNF_i$ of the NFP, with the selected recovery mechanism in step 11 for each $VNF_i$. (the same process as step 7)

Step 14: If ASDD is requested for the NS functionality, for each $VNF_i$ of the NFP, find the optimal value for the $CpI_i$ and networking option that satisfy inequation (31). To do so, all possible TBFLCs are generated for each $VNF_i$ using all possible $CpI_i$ values and networking options for the VNF. Then the TBFLCs of the VNF are sorted in a descending order. The first TBFLC which satisfies the inequation (31) is the optimal one and the corresponding $CpI_i$ and networking option is selected as optimal value and option for the VNF.

Step 15: For VNF shared between multiple NFPs, select the most stringent configuration values/options among the solutions found in steps 13 and 14 for the different NFPs.

Step 16: Calculate for each unmarked $VNF_i$ of the NsDF the $VnfEA_i$ using equation (39) based on the optimal value for its $MHR_i$ selected in steps 13 and 15.

Step 17: Find for every unmarked $VNF_i$ using the equation (2) the minimum number of standbys (i.e. M) that satisfies $A_{VNF_i} \geq VnfEA_i$.

Step 18: Assuming the computing cost of each hosting type is provided, calculate the computing cost of the NsDF using equation (34).

Step 19: Select the hosting type with the minimum computing cost for the NsDF. Once the hosting type is selected, adjusting the given NsDF by adding to the number of active instances the calculated number of standbys instances for the different scaling levels. In addition, the corresponding set of configuration values/ options found in steps 13 to 15 is stored as the optimal configuration for the NsDF.

Steps 7, 13 and 17 are the main steps of the method. The goal of step 7 and 13 is to find the optimal configuration which guarantees the RA and the ASDT, respectively, for each NS functionality at each scaling level and to minimize the networking cost. The goal of step 17 is to find the minimum number of required standbys which guarantees the required protection level for each unmarked VNF of the NsDF at each scaling level.

The values for the $MHR_i$ and the $CpI_i$ are discrete values and there is a limited number of available networking options for checkpointing. To find the optimal configuration in step 7 (and respectively in step 13), all possible combinations of the configuration values/options for all VNFs of the NFP need to be examined and the ones that satisfy the requirement and minimize the cost function of equation (37) is select. First, all possible $OT_{VNF_i}$ ($SDT_{VNF_i}$) for each $VNF_i$ of the NFP are generated using equation (7) (and respectively equation (17)). Then, the $OT_{VNF_i}$ (or the $SDT_{VNF_i}$) are sorted and their acceptable lower and upper bounds for each $VNF_i$ are determined as follows. The lower bound for $VNF_i$ is determined by using the best configuration values in equation (7) (or in (17)). The upper bound for $VNF_i$ can be found by using the best configuration values for all other VNFs in equation (26) (or in (28)). That is, the upper bond is the maximum acceptable $OT_{VNF_i}$ ($SDT_{VNF_i}$) for the $VNF_i$ satisfying $TDT_{NFP} \leq ADT$ (or $SDT_{NFP} \leq ASDT$), when the $OT_{VNF}$ (or $SDT_{VNF}$) of all other VNFs are at their minimum. By this, the possible range of $OT_{VNF_i}$ (or $SDT_{VNF_i}$) is obtained for each $VNF_i$ of the NFP. Every $OT_{VNF_i}$ (or $SDT_{VNF_i}$) of each $VNF_i$ represents a combination of configuration values (i.e. $MHR_i$, $CpI_i$, and $CNd_i$) for the $VNF_i$. So, to find the optimal configuration, all the possible $OT_{VNF_i}$ (or $SDT_{VNF_i}$) of all VNFs of the NFP are examined to find a combination for different VNFs that satisfies $TDT_{NFP} \leq ADT$ or $SDT_{NFP} \leq ASDT$ and minimizes the overall cost.

In step 17, the number of standbys is determined using equations (2) and (39) starting with one (i.e. M=1). The starting point is from M=1 since for unmarked VNFs, at least one standby instance should be added. The number of standbys is incremented until $A_{VNF_i} \geq VnfEA_i$ is satisfied.

Time Complexity Analysis

Steps 7 and 13 are the most time-consuming steps of the method. In this section, we analyze the complexity of these steps.

Let us assume that on average for a VNF there are:
HRN number of possible configuration values for the health-check rate,
CPN number of possible configuration values for checkpointing interval,
NON number of possible networking options for remote checkpointing.

If there are X number of different VNFs in an NFP and the tenant asks for an ASDT, the time complexity for examining all possible combinations (i.e. complete search) of configuration values in step 7 (and in step 13) would be:

$$\text{Time Complexity} = O((HRN*CPN*NON)^X) \quad (40)$$

Similarly, if the tenant asks for a RA, the time complexity for a complete search is:

$$\text{Time Complexity} = O(HRN^X) \quad (41)$$

Therefore, the time complexity of the complete search at step 7 (and also at step 13) is exponential in terms of the number of VNFs as in equations (40) and (41). Thus, for a large number of VNFs, it may not be possible to examine all possible combinations. Therefore, next, a heuristic search is proposed which finds a near-optimal configuration in a timely manner.

Heuristic Search

We have implemented the proposed method using the complete search and applied it to some sample NSs to find for them the optimal configuration values. From these samples, we have observed that the optimal configuration values for a NFP (i.e. NS functionality) always result in a $TDT_{NFP}$ (and $SDT_{NFP}$) very close to the ADT (and to the ASDT). This was expected, since when the mapping method finds the configuration, it should keep the $TDT_{NFP}$ (and $SDT_{NFP}$) as close as possible to the ADT (and to the ASDT) to minimize the networking cost function.

Based on this observation, to satisfy the RA, instead of examining all possible MHR values for each $VNF_i$ the heuristic algorithm examines only those values that satisfy the following condition:

$$0 \leq ADT - TDT_{NFP} \leq \text{Search\_Window} \quad (42)$$

If the ASDT is requested for a NS functionality, instead of examining all possible configuration values/options, our heuristic algorithm examines only those values/options that satisfy the following conditions:

$$0 \leq ASDT - SDT_{NFP} \leq \text{Search\_Window} \quad (43)$$

Validation that the configuration found by this heuristic search can be called a near-optimal configuration.

Whether the RA or the ASDT is requested for an NFP, an appropriate Search_Window needs to be chosen by the NS designer. Choosing a value closer to zero results in less execution time, at the price of sacrificing the thoroughness of the search. The found solution always satisfies the condition of inequation (42) for the RA (and (43) for the ASDT), but the $TDT_{NFP}$ (or the $SDT_{NFP}$) of this configuration and its total cost may not be very close to the $TDT_{NFP}$ (or $SDT_{NFP}$) and the total cost of the optimal configuration. The reason is that with a smaller search window, the number of combinations that step 7 (and 13) examines is reduced. Obviously, a bigger Search_Window results in a more thorough search but requires more execution time. So, the NS designer can decide on the desired value for the Search_Window to adjust the execution time.

In the rest of this section, we present the heuristic search for the ASDT. The heuristic search for the RA is almost the same. The only difference is that to meet the RA, only the MHR values of each VNF are examined and the CpI values and the networking options are not considered.

For the heuristic search the lower and upper bounds of the $SDT_{VNF_i}$ are found for each $VNF_i$ of the NFP the same way as for the complete search. However, once the boundaries of the $SDT_{VNF_i}$ are found for each $VNF_i$, all combinations of the $SDT_{VNF}$ values for the different VNFs of the NFP are not explored. Instead, only the combinations of $SDT_{VNF}$ values which fulfil the condition of inequation (43) are considered.

The pseudo-code of the heuristic search is presented in Alg. 1. It examines recursively all the combination of $SDT_{VNF}$ values for all VNFs of an NFP, which means that it starts with a $SDT_{VNF}$ value of one VNF and adds the SDT values of other VNFs one by one. At each level of the recursion, the set of possible $SDT_{VNF}$ (i.e. the Reduced_$SDT_i$) is reduced according to inequation (43). To find the reduced set of possible $SDT_{VNF}$, a binary search is used as its execution time complexity is low. The output of the algorithm is the near-optimal configuration for the NFP, which includes a near-optimal configuration for each VNF of the NFP.

---

Alg. 1: Heuristic Pseudo-code

---

1: for i ∈ {1, ... , X} do // X is the number of VNFs
2:   $SDT_i \leftarrow \varnothing$;
3: end for
4: Generate all the possible $SDT_{VNF}$ for each $VNF_i$ separately;
5: Sort $SDT_{VNF}$ for all VNFs in ascending order;
6: Find the lower and upper bound of $SDT_{VNF}$ for each $VNF_i$;
7: Create a set of acceptable $SDT_{VNF}$ for each $VNF_i$ separately ($SDT_i$);
8: i ← 1, optimalCost ← ∞, configuration ← ∅;
9: function findConfiguration(i, ASDT)
10:   if (i < X) then
11:     Reduced_$SDT_i$ ← All $SDT_{VNF}$ of $SDT_i$ that satisfy
         ($SDT_{NFP}$ ≤ ASDT);
12:     for $SDT_{VNF}$ ∈ Reduced_$SDT_i$ do
13:       findConfiguration(i + 1, ASDT − $SDT_{NFP}$);
14:     end for
15:   end if
16:   if (i == X) then
17:     Reduced_$SDT_i$ ← All $SDT_{VNF}$ of $SDT_i$ that satisfy
         (0 ≤ ASDT − $SDT_{NFP}$ ∈ Search_Window);
18:     for $SDT_{VNF}$ ∈ Reduced_$SDT_i$ do
19:       findConfiguration(i + 1, ASDT − SDTNFP);
20:     end for
21:   end if
22:   if (i > X) then
23:     cost ← cost of the selected configuration values;
24:     if (cost < optimalCost) then
25:       optimalCost ← cost;
26:       configuration ← selected configuration values for all VNFs;
27:     end if
28:   end if
29: end function

---

Validation

In this section the execution results of the method implemented with these two search strategies are presented. The first implementation performs a complete search by exploring all possible combinations of the configuration values/options in the step 7 and 13 to meet an ASDT. The other implementation uses our proposed heuristic search and examines a limited set of configuration combinations as described in the previous section. Both implementations are coded in Java, using Eclipse IDE. The experiments have been conducted on a physical machine of Intel Core i7 CPU at 2.20 Ghz.

Complete and Heuristic Search Results for a Sample NS

In this section, we present an example of the execution results of the mapping method for a sample NS with one scaling level and one available hosting type. The NsDF provides one functionality (i.e. it has only one NFP) for which the requested ASDT is 31536 ms per year (i.e. 0.000001 of a year). The NFP has four VNFs (i.e. X=4) with configuration options shown in Table 1. All VNFs checkpoint to a peer.

TABLE 1

VNFs and networking details for a sample NS

|   | N | $AFR_{VNF}$ (per year) | Min. HI (ms) | Min. CpI (ms) | $A_{vnf}$ | CNd1 (ms) | CNd2 (ms) | CNd3 (ms) |
|---|---|---|---|---|---|---|---|---|
| VNF | 6 | 3 | 100 | 50 | 0.999 | 50 | 180 | 500 |
| VNF | 10 | 2 | 50 | 10 | 0.99 | 150 | 200 | 3500 |
| VNF | 5 | 3 | 150 | 50 | 0.9999 | 40 | 100 | 2000 |
| VNF | 5 | 3 | 100 | 50 | 0.999 | 40 | 100 | 500 |

There are three available networking options for the checkpointing of each VNF with different CNds. The minimum HI (health-check interval) and the CpI of each VNF are also given in Table 1. For $VNF_i$, the health-check interval is configurable with increments of 100 ms. For all other VNFs, the health-check increment is 50 ms. Similarly, for $VNF_2$ and $VNF_4$, the CpI is configurable with increments of 200 ms. CpI is not configurable for $VNF_1$ and $VNF_3$. Failover time is FOT=10 ms for all VNFs. The takeover time (TOT) for $VNF_1$ is (TOT)=15 ms and for the others is (TOT)=10 ms.

We applied the Complete and the Heuristic Searches to this sample NS. The Search_Window for the heuristic algorithm was 1000 ms. For all the experiments we used: α=β=γ=1.

Table 2 shows the optimal configuration values and the number of required standbys calculated using the Complete Search. According to Table 2, the cost of this configuration would be C(NFP)=0.0841, and the SDT of the NFP is calculated as $SDT_{NFP}$=31.30 seconds.

TABLE 2

Optimal configuration values, using complete search

|   | HI | CPI | Net. Delay | M |
|---|---|---|---|---|
| $VNF_1$ | 200 ms | 50 ms | 500 ms | 2 |
| $VNF_2$ | 150 ms | 210 ms | 200 ms | 4 |
| $VNF_3$ | 350 ms | 50 ms | 2000 ms | 1 |
| $VNF_4$ | 300 ms | 250 ms | 100 ms | 2 |

Table 3 shows the result of using the Heuristic Search. The cost for this configuration is C(NFP)=0.0867 and the SDT of the NFP is $SDT_{NFP}$=31.45 seconds.

TABLE 3

Near-optimal configuration values, using heuristic search

|   | HI | CPI | Net. Delay | M |
|---|---|---|---|---|
| $VNF_1$ | 300 ms | 50 ms | 180 ms | 2 |
| $VNF_2$ | 150 ms | 210 ms | 200 ms | 4 |
| $VNF_3$ | 350 ms | 50 ms | 2000 ms | 1 |
| $VNF_4$ | 250 ms | 250 ms | 100 ms | 2 |

Comparing the output of the two implementations shows that the results of the complete and heuristic searches are very close, since the SDT of the heuristic search is only 0.5% different from the SDT of the complete search and the cost of the solution found by the heuristic search differs only 3.1% from the cost of the solution found by the complete search. The Complete Search results in slightly better cost and SDT.

Execution Time Comparison

We expected that with a higher number of VNFs, the execution time of the Complete Search would increase exponentially. So, we executed the two implementations for different numbers of VNFs to benchmark the execution time and the accuracy of the Heuristic Search. For this experiment, the VNFs and networking information are given in Table 4.

TABLE 4

VNFs and networking details for one scaling level of the NFP

| | N | AFR$_{VNF}$ (per year) | Min. HI (ms) | Min. CpI (ms) | A$_{vnf}$ | CNd1 (ms) | CNd2 (ms) | CNd3 (ms) |
|---|---|---|---|---|---|---|---|---|
| VNF$_1$ | 4 | 2 | 100 | 20 | 0.99 | 30 | 100 | 300 |
| VNF$_2$ | 7 | 3 | 100 | 40 | 0.999 | 100 | 200 | 2000 |
| VNF$_3$ | 6 | 2 | 100 | 50 | 0.999 | 50 | 100 | 2000 |
| VNF$_4$ | 3 | 3 | 150 | 50 | 0.9999 | 100 | 500 | 3000 |
| VNF$_5$ | 7 | 2 | 100 | 40 | 0.999 | 50 | 180 | 500 |
| VNF$_6$ | 11 | 1 | 50 | 10 | 0.99 | 150 | 200 | 3500 |
| VNF$_7$ | 4 | 4 | 100 | 100 | 0.999 | 40 | 100 | 2000 |
| VNF$_8$ | 6 | 3 | 100 | 50 | 0.9999 | 40 | 100 | 2000 |

Table 5 shows the execution times for each implementation, the number of examined combinations, as well as their outputs for the cost and SDT for the NFP.

TABLE 5

Optimal/near-optimal configuration values, using both implementations

| Number of VNFs (X) | Algorithm | Execution time (ms) | Number of combinations | Cost | SDT |
|---|---|---|---|---|---|
| 2 | Complete | 3 | 8,786 | 0.0613 | 30.9 |
| | Heuristic | 1 | 135 | 0.0617 | 31.49 |
| 3 | Complete | 38 | 237775 | 0.0876 | 31.47 |
| | Heuristic | 16 | 8026 | 0.0881 | 31.52 |
| 4 | Complete | 332 | 12392801 | 0.0979 | 31.44 |
| | Heuristic | 83 | 398952 | 0.0979 | 31.44 |
| 5 | Complete | 21719 | 775919707 | 0.1339 | 31.3 |
| | Heuristic | 871 | 6313688 | 0.1339 | 31.3 |
| 6 | Complete | N/A | N/A | N/A | N/A |
| | Heuristic | 4905 | 42686536 | 0.1593 | 31.5 |
| 7 | Complete | N/A | N/A | N/A | N/A |
| | Heuristic | 16034 | 75285642 | 0.1976 | 31.48 |
| 8 | Complete | N/A | N/A | N/A | N/A |
| | Heuristic | 29849 | 78694978 | 0.2528 | 31.41 |

As Table 5 shows, for the Complete Search the execution time and the number of combinations increase drastically as the number of VNFs for the NFP increases, and for X≥6, we could not complete the Complete Search anymore.

Figure 3:
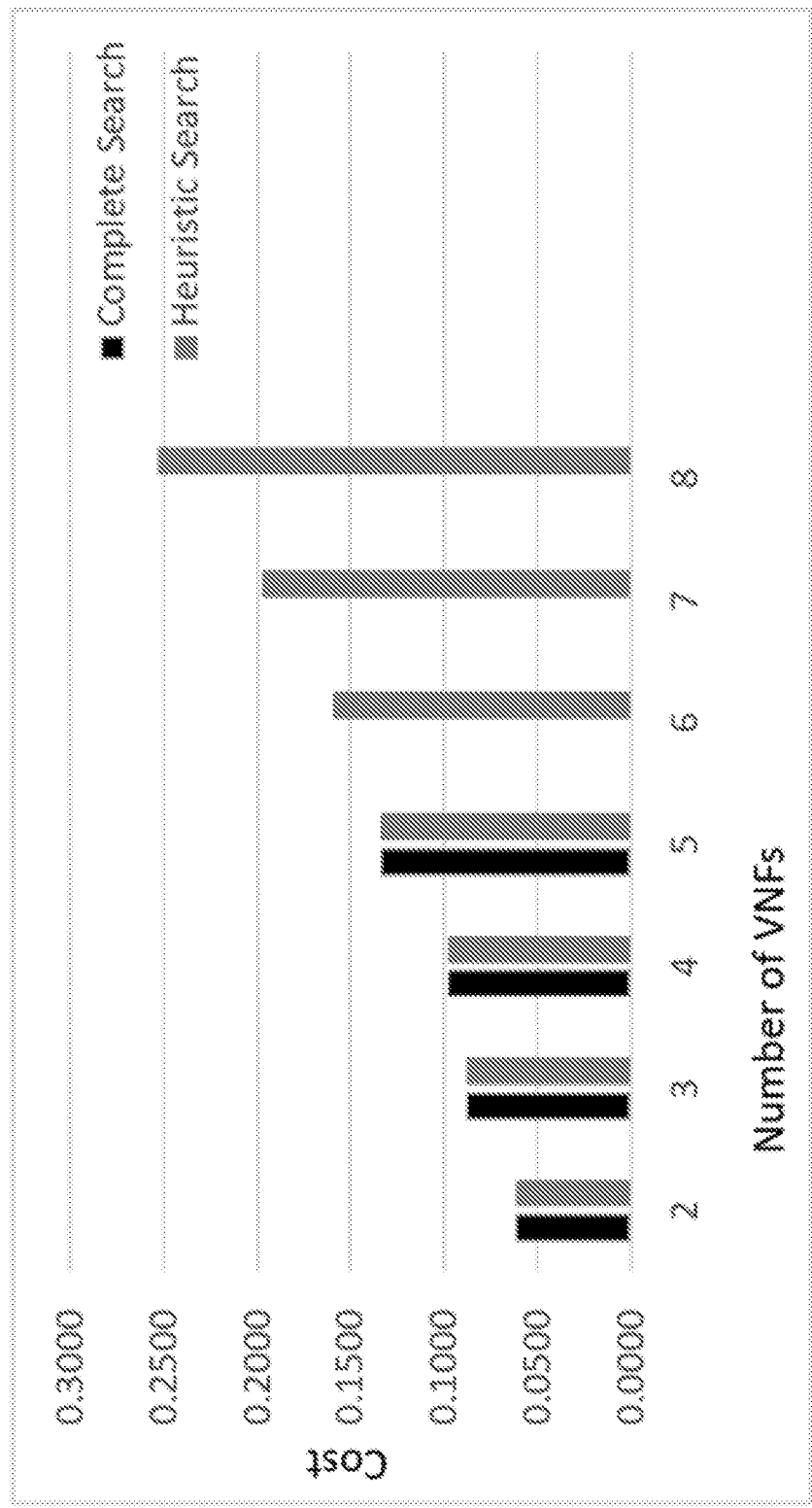
FIG. 3 is a graph illustrating optimal and near-optimal cost comparison.
Figure 4:
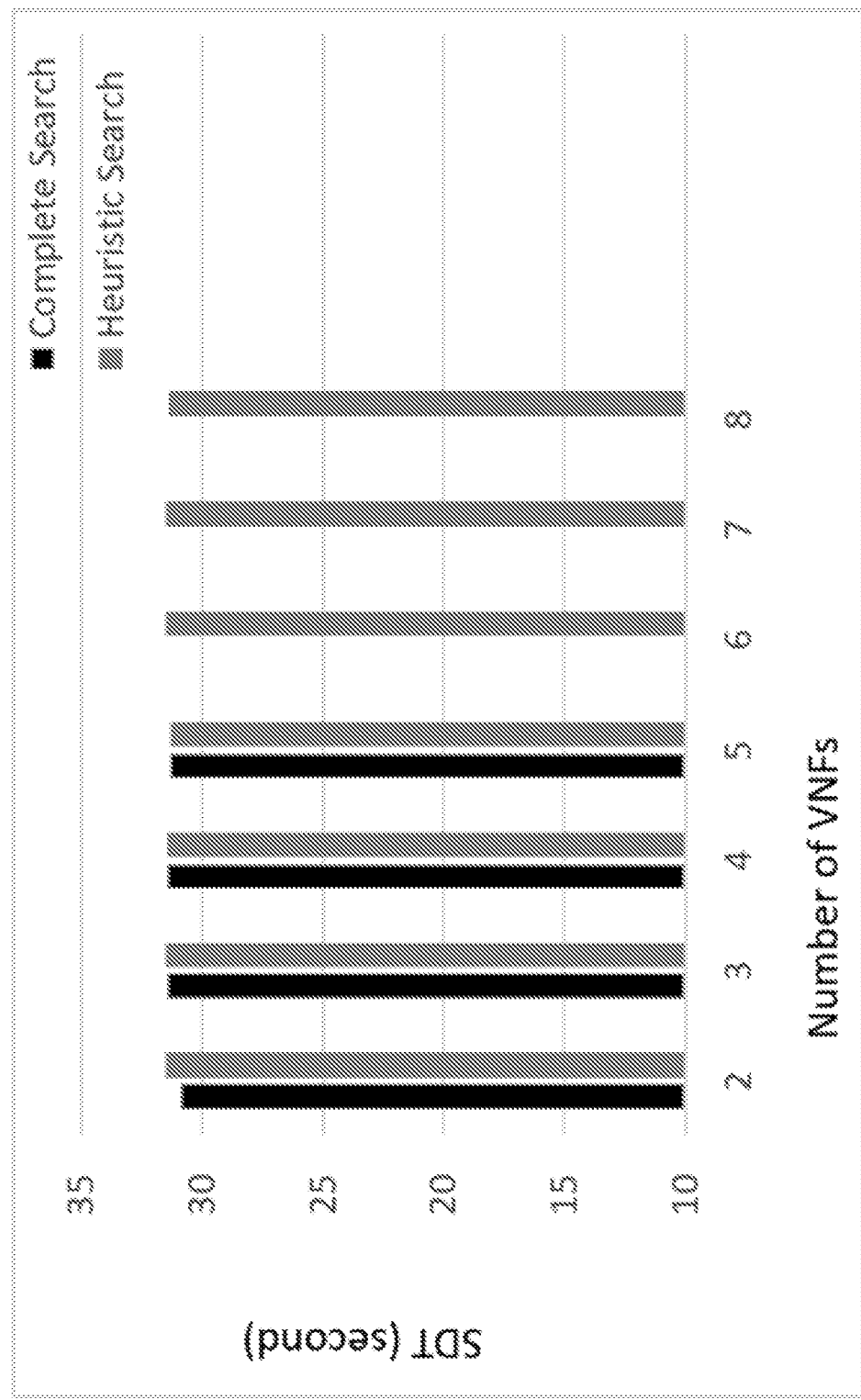
FIG. 4 is a graph illustrating optimal and near-optimal SDT comparison.

FIG. 3 and FIG. 4 compare the costs and the SDT s. The results are almost the same for the two implementations. The SDT of the heuristic search differs on average 0.52% from the SDT of the complete search with the standard deviation of 0.81, while the cost calculated by the heuristic search differs on average 0.28% from the cost calculated by the complete search with the standard deviation of 0.28.

Figure 5:
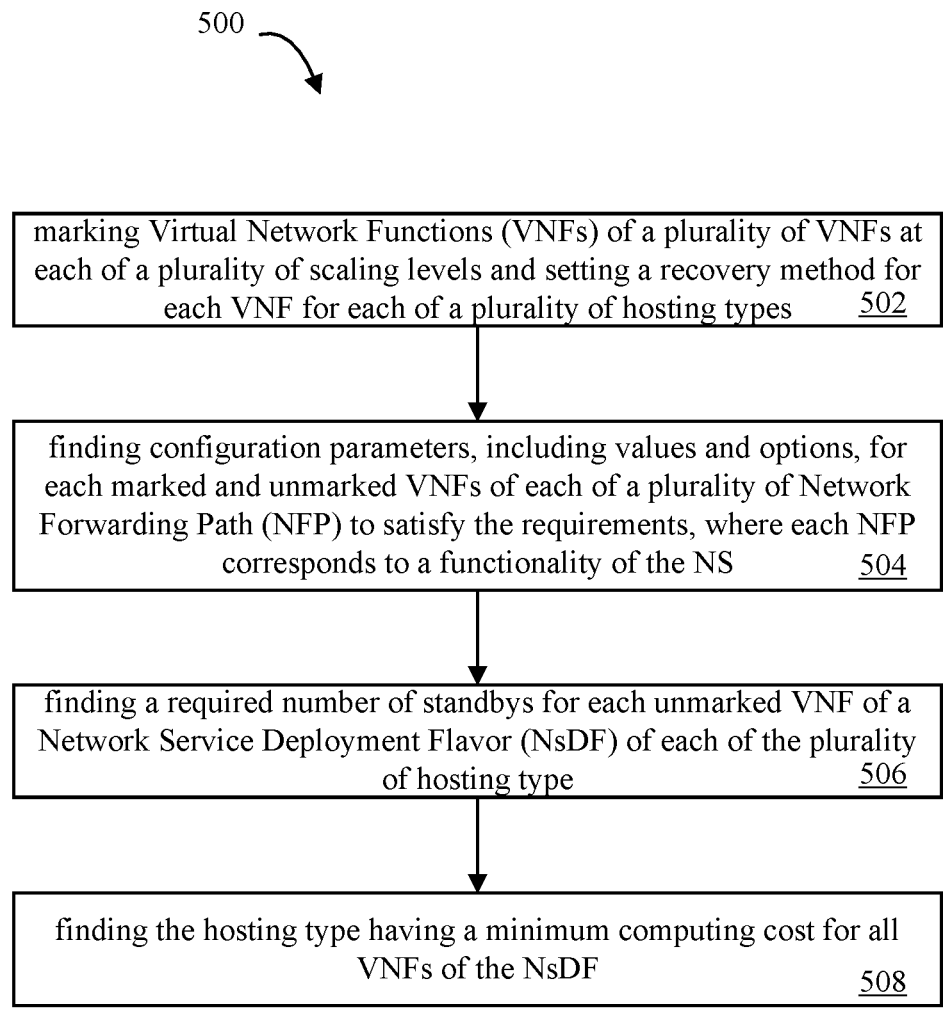
FIG. 5 is a flowchart of a method of mapping high level requirements to low level configuration parameters and redundancy.

FIG. 5 illustrates a method 500 of mapping, for a network service (NS), requirements to configuration parameters and redundancy. The method comprises marking, step 502, Virtual Network Functions (VNFs) of a plurality of VNFs at each of a plurality of scaling levels and setting a recovery method for each VNF for each of a plurality of hosting types. The method comprises finding, step 504, configuration parameters, including values and options, for each marked and unmarked VNFs of each of a plurality of Network Forwarding Path (NFP) to satisfy the requirements, where each NFP corresponds to a functionality of the NS. The method comprises finding, step 506, a required number of standbys for each unmarked VNF of a Network Service Deployment Flavor (NsDF) of each of the plurality of hosting type. The method comprises finding, step 508, the hosting type having a minimum computing cost for all VNFs of the NsDF.

A person skilled in the art would understand that the different occurrences of the word finding as used herein could be replaced by defining, identifying, computing, obtaining, or other words with a similar meaning.

In the method, the requirements may include at least one of: Required Availability (RA), Acceptable Service Disruption Time (ASDT), and Acceptable Service Data Disruption (ASDD).

The configuration parameters may include at least one of: Monitoring Health-check Rate (MHR), Checkpointing Interval (CpI), a recovery mechanism, a number of standby instances, a hosting type and networking options.

The NS may provide different functionality, and a different RA is requested for each of the different functionality.

A VNF may be marked if $A_{VNF_{i,0}} \geq VnfEA_i$ and $OT_{i\text{-}best} \leq OT_i$, where VnfEA is an expected availability of VNF$_i$, where OT is an outage time, and where A$_{VNF}$ is computed using:

$$A_{VNF} = \sum_{k=0}^{M} \binom{N+M}{N+k} A_{vnf}^{N+k} * (1 - A_{vnf})^{M-k},$$

where N>0 & M≥0, where k is an index iterating from 0 to M, where N is a number of active instances, where M, a number of standby instances, is equal to zero ($A_{VNF_{i,0}}$), using a best OT of each VNF$_i$ for restart recovery mechanism ($OT_{i\text{-}best}$) and using a best Monitoring Health check Rate (MHR$_i$).

The recovery method may be set to restart for each marked VNF and is set to failover for each unmarked VNF.

Finding the configuration parameters to satisfy the RA may comprise computing a Total Down Time (TDT) for each NFP using: $TDT_{NFP} = \Sigma_{i=1}^{X} OT_i$, where $OT_i$ is an outage time of VNF$_i$ in a given period, computing a total cost C for each NFP at each scaling level j using: $C(NFP_j) = \Sigma_{i=1}^{X} C$ (VNF$_{i,j}$) and selecting values for Monitoring Health check Rate (MHR) for each VNF that result in the cost C being minimum cost and in the TDT being below an acceptable downtime (ADT).

Finding the configuration parameters to satisfy the ASDT may comprise computing a Service Disruption Time (SDT) for each NFP using: $SDT_{NFP} = \Sigma_{i=1}^{X} SDT_i$, computing a total cost C for each NFP at each scaling level j using: $C(NFP_j) = \Sigma_{i=1}^{X} C(VNF_{i,j})$ and selecting values for Checkpointing Interval (CpI), Monitoring Health-check Rate (MHR) and networking options for each VNFs that result in the cost C being minimum and in the SDT being below the ASDT.

Finding the configuration parameters to satisfy the ASDD may comprise adjusting a Time Between a Failure and the Latest Committed checkpoint (TBFLC)$_i$ of each VNF$_i$ of an NFP having X different VNFs, to satisfy:

$$TBFLC_i \leq \frac{ASDD}{(\text{Data\_Rate}_i) * (\text{Ratio}_i)},$$

where $1 \leq i \leq X$, where Data_Rate$_i$, is a data rate of VNF$_i$ and Ratio$_i$ is a ratio between each VNF$_i$ data rate and a data rate of the NFP.

Finding a required number of standbys for each unmarked VNF may comprise finding a minimum number of standbys that satisfies: $A_{VNF_i} \geq VnfEA_i$, where VnfEA is an expected availability of VNF$_i$ and $A_{VNF_i}$ is an availability of VNF$_i$ computed using:

$$A_{VNF} = \sum_{k=0}^{M} \binom{N+M}{N+k} A_{vnf}^{N+k} * (1 - A_{vnf})^{M-k},$$

where N>0 & M≥0, where k is an index iterating from 0 to M, and where N is a number of active instances and M is a number of standby instances.

Finding the hosting type having the minimum computing cost for all VNFs of the NsDF may be done using: $C(NsDF) = \sum_{i=1}^{X} C(VNF_i)$, where $C(VNF_i)$ is the cost for VNF$_i$ and C(NsDF) is the cost for the NsDF.

The method of FIG. 5 may further comprise any of the steps described herein.

Figure 6:
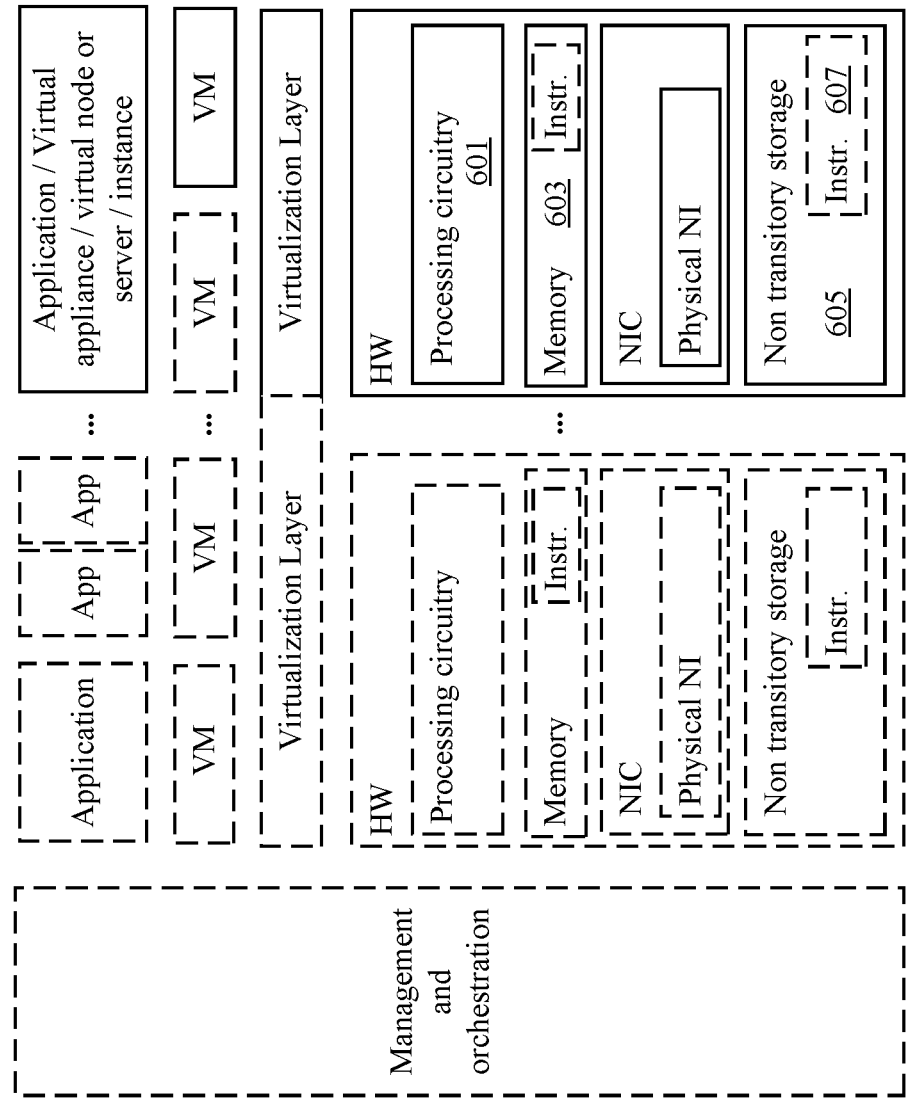
FIG. 6 is a schematic illustration of a virtualization environment in which the different method and system described herein can be deployed.

Referring to FIG. 6, there is provided a virtualization environment in which functions and steps described herein can be implemented.

A virtualization environment (which may go beyond what is illustrated in FIG. 6), may comprise systems, networks, servers, nodes, devices, etc., that are in communication with each other either through wire or wirelessly. Some or all of the functions and steps described herein may be implemented as one or more virtual components (e.g., via one or more applications, components, functions, virtual machines or containers, etc.) executing on one or more physical apparatus in one or more networks, systems, environment, etc.

A virtualization environment provides hardware comprising processing circuitry 601 and memory 603. The memory can contain instructions executable by the processing circuitry whereby functions and steps described herein may be executed to provide any of the relevant features and benefits disclosed herein.

The hardware may also include non-transitory, persistent, machine readable storage media 605 having stored therein software and/or instruction 607 executable by processing circuitry to execute functions and steps described herein.

There is provided a system, or alternatively a network node (which may be virtual) or hardware (HW), as illustrated in FIG. 6, operative to map, for a network service (NS), requirements to configuration parameters and redundancy. The system comprises processing circuitry 601 and a memory 603, 605, the memory containing instructions executable by the processing circuitry whereby the system is operative to mark Virtual Network Functions (VNFs) of a plurality of VNFs at each of a plurality of scaling levels and set a recovery method for each VNF for each of a plurality of hosting types. The system is operative to find configuration parameters, including values and options, for each marked and unmarked VNFs of each of a plurality of Network Forwarding Path (NFP) to satisfy the requirements, where each NFP corresponds to a functionality of the NS. The system is operative to find a required number of standbys for each unmarked VNF of a Network Service Deployment Flavor (NsDF) of each of the plurality of hosting type. The system is operative to find the hosting type having a minimum computing cost for all VNFs of the NsDF.

The system is further operative to execute any of the steps described herein, such as the steps described in relation with FIG. 5, or any of the other steps described previously.

Still referring to FIG. 6, there is provided a non-transitory computer readable 605 media having stored thereon instructions 607 for mapping, for a network service (NS), requirements to configuration parameters and redundancy. The instructions comprise marking Virtual Network Functions (VNFs) of a plurality of VNFs at each of a plurality of scaling levels and setting a recovery method for each VNF for each of a plurality of hosting types. The instructions comprise finding configuration parameters, including values and options, for each marked and unmarked VNFs of each of a plurality of Network Forwarding Path (NFP) to satisfy the requirements, where each NFP corresponds to a functionality of the NS. The instructions comprise finding a required number of standbys for each unmarked VNF of a Network Service Deployment Flavor (NsDF) of each of the plurality of hosting type. The instructions comprise finding the hosting type having a minimum computing cost for all VNFs of the NsDF.

The non-transitory computer readable media may have stored thereon further instructions to execute any of the steps described herein, such as the steps described in relation with FIG. 5, or any of the other steps described previously.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. Although specific terms may be employed herein, they are used in a generic and descriptive sense only and not for purposes of limitation.

The invention claimed is:

1. A method of mapping, for a network service (NS), requirements to configuration parameters and redundancy comprising:
    marking Virtual Network Functions (VNFs) of a plurality of VNFs at each of a plurality of scaling levels and setting a recovery method for each VNF for each of a plurality of hosting types;
    finding configuration parameters, including values and options, for each marked and unmarked VNFs of each of a plurality of Network Forwarding Path (NFP) to satisfy the requirements, where each NFP corresponds to a functionality of the NS;
    finding a required number of standbys for each unmarked VNF of a Network Service Deployment Flavor (NsDF) of each of the plurality of hosting type; and
    minimizing computing costs for all VNFs of the NsDF by finding the hosting type having a minimum computing cost, using:

$C(NsDF) = \sum_{i=1}^{X} C(VNF_i)$ where $C(VNF_i)$ is the cost for VNF$_i$ and C(NsDF) is the cost for the NsDF.

2. The method of claim 1, wherein the requirements include at least one of:
    Required Availability (RA), Acceptable Service Disruption Time (ASDT), and Acceptable Service Data Disruption (ASDD).

3. The method of claim 1, wherein the configuration parameters include at least one of: Monitoring Health-check Rate (MHR), Checkpointing Interval (CpI), a recovery mechanism, a number of standby instances, a hosting type and networking options.

4. The method of claim 2, wherein the NS provides different functionality, and a different RA is requested for each of the different functionality.

5. The method of claim 1, wherein a VNF is marked if:

$$A_{VNF_{i \cdot o}} \geq VnfEA_i \text{ and } OT_{i\text{-}best} \leq OT_i,$$

where VnfEA is an expected availability of $VNF_i$, where OT is an outage time, and where $A_{VNF}$ is computed using:

$$A_{VNF} = \sum_{k=0}^{M} \binom{N+M}{N+k} A_{vnf}^{N+k} * (1 - A_{vnf})^{M-k},$$

where N>0 & M≥0
where k is an index iterating from 0 to M, where N is a number of active instances, where M, a number of standby instances, is equal to zero ($A_{VNF_{i \cdot o}}$), using a best OT of each $VNF_i$ for restart recovery mechanism ($OT_{i\text{-}best}$) and using a best Monitoring Health check Rate ($MHR_i$).

6. The method of claim 1, wherein the recovery method is set to restart for each marked VNF and is set to failover for each unmarked VNF.

7. The method of claim 2, wherein finding the configuration parameters to satisfy the RA comprises:
computing a Total Down Time (TDT) for each NFP using:

$$TDT_{NFP} = \sum_{i=1}^{X} OT_i$$

where $OT_i$ is an outage time of $VNF_i$ in a given period,
computing a total cost C for each NFP at each scaling level j using:

$$C(NFP_j) = \sum_{i=1}^{X} C(VNF_{i,j})$$

and
selecting values for Monitoring Health check Rate (MHR) for each VNF that result in the cost C being minimum cost and in the TDT being below an acceptable downtime (ADT).

8. The method of claim 2, wherein finding the configuration parameters to satisfy the ASDT comprises:
computing a Service Disruption Time (SDT) for each NFP using:

$$SDT_{NFP} = \sum_{i=1}^{X} SDT_i$$

computing a total cost C for each NFP at each scaling level j using:

$$C(NFP_j) = \sum_{i=1}^{X} C(VNF_{i,j})$$

and
selecting values for Checkpointing Interval (CpI), Monitoring Health-check Rate (MHR) and networking options for each VNFs that result in the cost C being minimum and in the SDT being below the ASDT.

9. The method of claim 2, wherein finding the configuration parameters to satisfy the ASDD comprises:
adjusting a Time Between a Failure and the Latest Committed checkpoint $(TBFLC)_i$ of each $VNF_i$ of an NFP having X different VNFs, to satisfy:

$$TBFLC_i \leq \frac{ASDD}{(Data\_Rate_i) * (Ratio_i)},$$

where $1 \leq i \leq X$
where $Data\_Rate_i$ is a data rate of VNFi and $Ratio_i$ is a ratio between each $VNF_i$ data rate and a data rate of the NFP.

10. The method of claim 1, wherein finding a required number of standbys for each unmarked VNF comprises finding a minimum number of standbys that satisfies:

$$A_{VNF_i} \geq VnfEA_i$$

where VnfEA is an expected availability of $VNF_i$ and $A_{VNFi}$ is an availability of $VNF_i$ computed using:

$$A_{VNF} = \sum_{k=0}^{M} \binom{N+M}{N+k} A_{vnf}^{N+k} * (1 - A_{vnf})^{M-k},$$

where N>0 & M≥0
where k is an index iterating from 0 to M, and where N is a number of active instances and M is a number of standby instances.

11. A system operative to map, for a network service (NS), requirements to configuration parameters and redundancy comprising processing circuitry and a memory, the memory containing instructions executable by the processing circuitry whereby the system is operative to:
mark Virtual Network Functions (VNFs) of a plurality of VNFs at each of a plurality of scaling levels and set a recovery method for each VNF for each of a plurality of hosting types;
find configuration parameters, including values and options, for each marked and unmarked VNFs of each of a plurality of Network Forwarding Path (NFP) to satisfy the requirements, where each NFP corresponds to a functionality of the NS;
find a required number of standbys for each unmarked VNF of a Network Service Deployment Flavor (NsDF) of each of the plurality of hosting type; and
minimize computing costs for all VNFs of the NsDF by finding the hosting type having a minimum computing cost, using:

$$C(NsDF) = \sum_{i=1}^{X} C(VNF_i)$$

where $C(VNF_i)$ is the cost for $VNF_i$ and C(NsDF) is the cost for the NsDF.

12. The system of claim 11, wherein the requirements include at least one of: Required Availability (RA), Acceptable Service Disruption Time (ASDT), and Acceptable Service Data Disruption (ASDD).

13. The system of claim 11, wherein the configuration parameters include at least one of: Monitoring Health-check Rate (MHR), Checkpointing Interval (CpI), a recovery mechanism, a number of standby instances, a hosting type and networking options.

14. The system of claim 12, wherein the NS provides different functionality, and a different RA is requested for each of the different functionality.

15. The system of claim 11, wherein a VNF is marked if:

$$A_{VNF_{i \cdot o}} \geq VnfEA_i \text{ and } OT_{i\text{-}best} \leq OT_i,$$

where VnfEA is an expected availability of $VNF_i$, where OT is an outage time, and where $A_{VNF}$ is computed using:

$$A_{VNF} = \sum_{k=0}^{M} \binom{N+M}{N+k} A_{vnf}^{N+k} * (1 - A_{vnf})^{M-k},$$

where N>0 & M≥0
where k is an index iterating from 0 to M, where N is a number of active instances, where M, a number of standby instances, is equal to zero ($A_{VNF_{i\text{-}o}}$), using a best OT of each $VNF_i$ for restart recovery mechanism ($OT_{i\text{-}best}$) and using a best Monitoring Health check Rate ($MHR_i$).

16. The system of claim 11, wherein the recovery method is set to restart for each marked VNF and is set to failover for each unmarked VNF.

17. The system of claim 12, further operative to find the configuration parameters to satisfy the RA by:
computing a Total Down Time (TDT) for each NFP using:

$$TDT_{NFP} = \Sigma_{i=1}^{X} OT_i$$

where $OT_i$ is an outage time of $VNF_i$ in a given period,
computing a total cost C for each NFP at each scaling level j using:

$$C(NFP_j) = \Sigma_{i=1}^{X} C(VNF_{i,j})$$

and
selecting values for Monitoring Health check Rate (MHR) for each VNF that result in the cost C being minimum cost and in the TDT being below an acceptable downtime (ADT).

18. The system of claim 12, further operative to find the configuration parameters to satisfy the ASDT by:
computing a Service Disruption Time (SDT) for each NFP using:

$$SDT_{NFP} = \Sigma_{i=1}^{X} SDT_i$$

computing a total cost C for each NFP at each scaling level j using:

$$C(NFP_j) = \Sigma_{i=1}^{X} C(VNF_{i,j})$$

and
selecting values for Checkpointing Interval (CpI), Monitoring Health-check Rate (MHR) and networking options for each VNFs that result in the cost C being minimum and in the SDT being below the ASDT.

19. The system of claim 12, further operative to find the configuration parameters to satisfy the ASDD by:
adjusting a Time Between a Failure and the Latest Committed checkpoint $(TBFLC)_i$ of each $VNF_i$ of an NFP having X different VNFs, to satisfy:

$$TBFLC_i \leq \frac{ASDD}{(Data\_Rate_i) * (Ratio_i)},$$

where $1 \leq i \leq X$
where $Data\_Rate_i$ is a data rate of VNFi and $Ratio_i$ is a ratio between each $VNF_i$ data rate and a data rate of the NFP.

20. The system of claim 11, further operative to find a required number of standbys for each unmarked VNF by find a minimum number of standbys that satisfies:

$$A_{VNF_i} \geq VnfEA_i$$

where VnfEA is an expected availability of $VNF_i$ and $A_{VNFi}$ is an availability of $VNF_i$ computed using:

$$A_{VNF} = \Sigma_{k=0}^{M} \binom{N+M}{N+k} A_{vnf}^{N+k} * (1 - A_{vnf})^{M-k},$$

where N>0 & M≥0
where k is an index iterating from 0 to M, and where N is a number of active instances and M is a number of standby instances.

21. A non-transitory computer readable media having stored thereon instructions for mapping, for a network service (NS), requirements to configuration parameters and redundancy, the instructions comprising:
marking Virtual Network Functions (VNFs) of a plurality of VNFs at each of a plurality of scaling levels and setting a recovery method for each VNF for each of a plurality of hosting types;
finding configuration parameters, including values and options, for each marked and unmarked VNFs of each of a plurality of Network Forwarding Path (NFP) to satisfy the requirements, where each NFP corresponds to a functionality of the NS;
finding a required number of standbys for each unmarked VNF of a Network Service Deployment Flavor (NsDF) of each of the plurality of hosting type; and
minimizing computing costs for all VNFs of the NsDF by finding the hosting type having a minimum computing cost, using:

$$C(NsDF) = \Sigma_{i=1}^{X} C(VNF_i)$$

where $C(VNF_i)$ is the cost for $VNF_i$ and C(NsDF) is the cost for the NsDF.

* * * * *